(12) United States Patent
Machii et al.

(10) Patent No.: US 6,324,467 B1
(45) Date of Patent: Nov. 27, 2001

(54) INFORMATION PROVIDING SYSTEM

(75) Inventors: Kimiyoshi Machii, Hitachi; Kazuyoshi Koga, Kodaira; Shigeru Matsuo, Hitachinaka; Yoshitaka Atarashi, Hitachi; Soshiro Kuzunuki, Hitachinaka; Keiko Abe, Hitachi; Toshimi Yokota, Hitachiohta, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/518,908

(22) Filed: Mar. 3, 2000

(30) Foreign Application Priority Data

Mar. 5, 1999 (JP) .................................. 11-058653
Jun. 28, 1999 (JP) .................................. 11-181072

(51) Int. Cl.[7] .................................................. G01C 21/00
(52) U.S. Cl. ........................ 701/200; 701/201; 701/202; 701/207
(58) Field of Search ................................... 701/200, 201, 701/202, 204, 208, 209, 212, 213

(56) References Cited

U.S. PATENT DOCUMENTS

| | | | | |
|---|---|---|---|---|
| 6,001,609 | * | 6/2000 | Narioka | 701/202 |
| 6,202,022 | * | 3/2001 | Ando et al. | 701/200 |
| 6,202,024 | * | 3/2001 | Yogoyama et al. | 701/200 |
| 6,212,475 | * | 4/2001 | France et al. | 701/207 |
| 6,249,740 | * | 6/2001 | Ito et al. | 701/201 |

FOREIGN PATENT DOCUMENTS

987812 * 1/1983 (SU) ..................................... 701/200

* cited by examiner

Primary Examiner—Richard M. Camby
(74) Attorney, Agent, or Firm—Antonelli, Terry, Stout & Kraus, LLP

(57) ABSTRACT

An information providing system is capable of rendering map-information services even if the size of a free area in a memory employed in a terminal becomes small, disallowing all details of a map to be downloaded. A server employed in the information providing system has a search engine for searching a map data base for a map suitable for a destination and the present position of the terminal as received from the terminal, a route computing unit for computing a guide route from the present position to the destination, a map display location determination unit for determining a location at which route information including a map based on the calculated guide route is to be transmitted to the terminal and a thinning determination unit for thinning the information to be transmitted based on information on the terminal received from the terminal. The thinning determination unit has a priority-level definition table for defining priority levels assigned to map elements stored in the map data base.

30 Claims, 18 Drawing Sheets

| MEMBER ID 801 | DATA AMOUNT 802 | IMAGE/VECTOR 803 | ACCESS DATA&TIME 804 |
|---|---|---|---|
| 0001 | 250KB | VECTOR | 1998.10.2 15:43 |
| ⋮ | ⋮ | ⋮ | ⋮ |

| | 1201 | 1202 | 1203 | 1204 | 1205 |
|---|---|---|---|---|---|
| | NAME | MEMBER ID | PORTABLE TELEPHONE NUMBER | FINANCIAL INSTITUTION | CONTACT |
| | A | 002536 | 080****** | ABC BANK | THE HITACHI-CITY, IBARAKI PREFECTURE |
| | : | : | : | : | : |

| 1 | EXPRESSWAY |
| --- | --- |
| 2 | HIGHWAY |
| 3 | ORDINARY NATIONAL ROAD |
| 4 | PREFECTURAL ROAD |
| 5 | CITY ROAD |

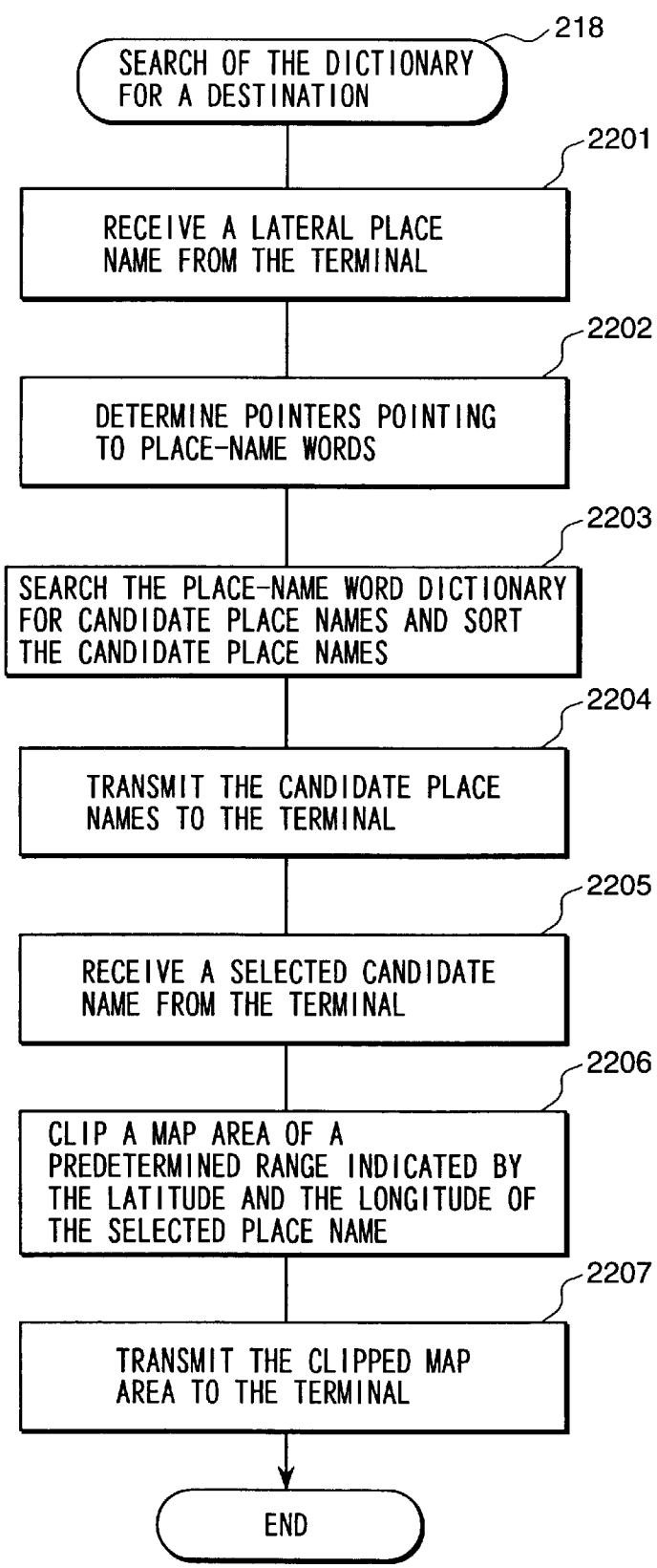

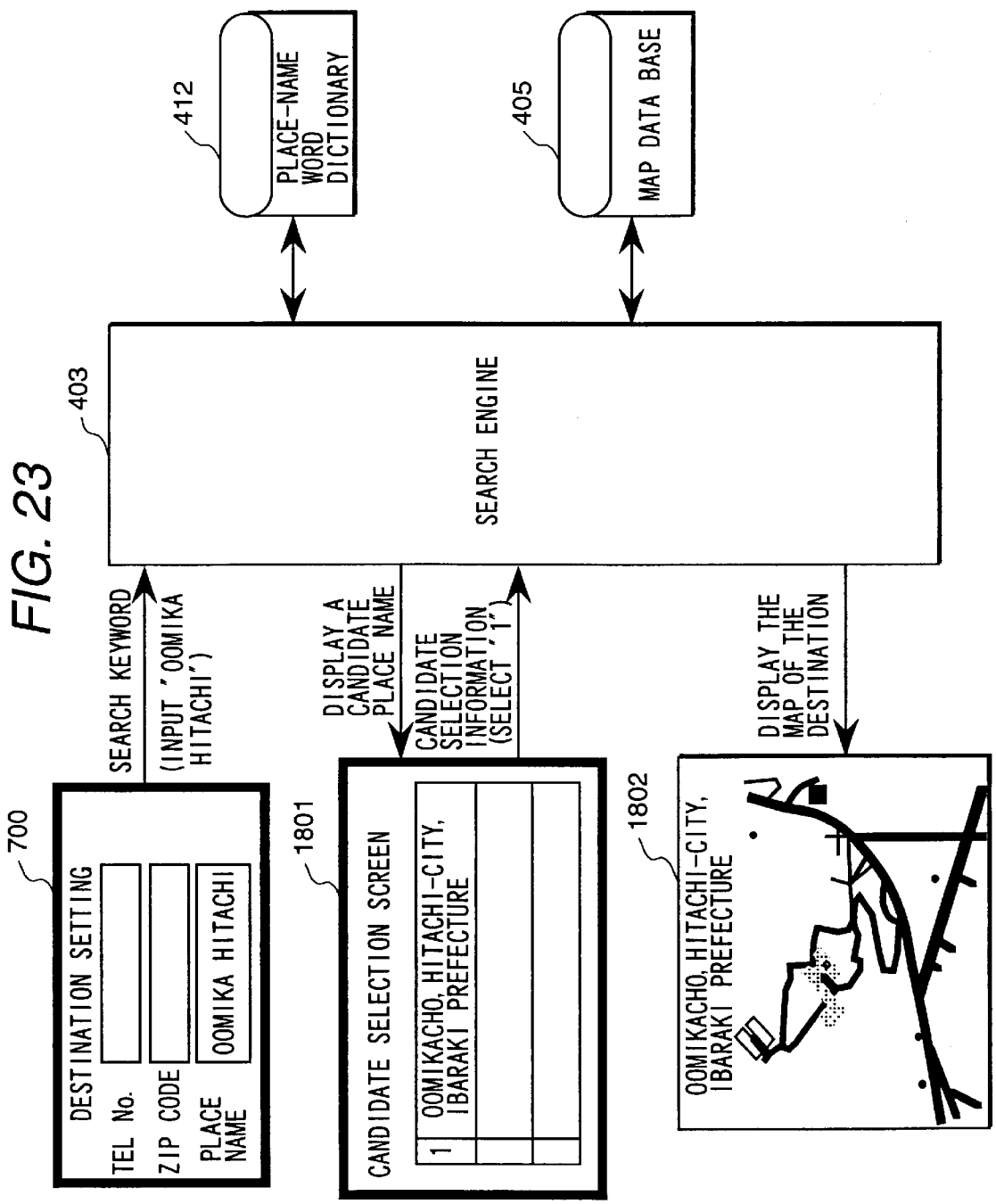

INFORMATION PROVIDING SYSTEM

FIELD OF THE INVENTION

The present invention relates to an information terminal for accessing a network and a server system for providing information. More particularly, the present invention relates to an information providing system comprising an information terminal which is capable of accessing the Internet from a variety of places, such as from a home, for a mobile body like a car, or from a street while the user is walking, and a server for providing such a terminal with information appropriate for a place where the terminal is used.

BACKGROUND OF THE INVENTION

JPA 10-105053 and 7-262494 disclose map information providing systems of a network type and are referred to hereafter as first and second publications, respectively. With the system disclosed in the first publication, map information is received in predetermined area units in a car, and, before the car moves from the present area to the next area, map information of the next area is received. After the map information of a next area has been received, the map information of the present area is erased. In the system disclosed in the second publication, on the other hand, route information is stored at a center. A terminal transmits information which identifies the present position and a destination to the center. In response to such information, the center transmits main information on the vicinity of the present position to the terminal.

JPA 10-122885 discloses a navigation apparatus and is referred to hereafter as a third publication. According to the apparatus described in the third publication, a travel route is entered in the main unit of a navigation apparatus via a computer for inputting a route. When a vehicle is approaching a branch in the route, the navigation system determines a branch direction based on the entered travel route and the present position.

JPA 7-332993 also discloses a navigation system and is referred to hereafter as a fourth publication. The navigation system of the fourth publication has a means for detecting crossings to be encountered in the future and complicated crossings.

JPA 10-325734 is a fifth publication which discloses a system wherein an operation to enter a desired destination is made simple. According to the fifth publication, there is a proposed technique for searching a word dictionary for candidates for a desired destination by using a wild card entered by the user and displaying the candidates found in the search, making it unnecessary for the user to enter the entire string of characters representing the desired destination.

The Internet also has a page for rendering services by displaying the names of candidates for a location of interest by accepting the literal (written) phonetic transcription of the name or some kanji characters thereof. These Internet services will be referred to as a first Internet technique.

The Internet also provides services which involve the display of a map and the loading of a new map for a predetermined range centering at a coordinate point from a server when it is desired to move a vehicle up or down or in the right or left direction from the present position on the displayed map. The services make use of a scroll button to move the position. These Internet services be referred to as a second Internet technique.

In the system described in the first publication, the entire map of a next area is downloaded when a border of the present map is approached. Thus, there is a problem of the memory running out of space in the terminal. Thus, the system allows the previously used map to be deleted. Since a used map is not erased before the map of a next area is downloaded, however, the problem of an insufficient memory space is not solved. In addition, the map of the next area is downloaded after a border of the present map is approached. It is thus quite within the bounds of possibility that all of the next map can not be downloaded even after the border has been crossed due to, for example, the fact that the map is downloaded while the vehicle is passing through a tunnel. In this case, the user can not see the next map even after the vehicle has entered the next area. Furthermore, there is a case in which, even though the user merely needs to drive the vehicle straight along the present road so that no map is necessarily required, a next map is inadvertently downloaded, raising the communication charge.

In the system described in the second publication, the map of the vicinity of the present positional which the terminal is located is downloaded on the basis of information on the present position. Thus, much like the system disclosed in the first publication, it is also quite within the bounds of possibility that communication is disabled while a next map is being downloaded, making further downloading impossible, so that the user is incapable of referring to the next map. In addition, there is no description of a solution to the problem of an insufficient memory area, leading us to believe that the operation proposed in the second publication is not capable of resolving the problem.

In the case of the system disclosed in the third and fourth publications, since data stored in a data base of the terminal is used, the systems are not capable of keeping up with new updates of a map, such as additional new roads and closed ones. In the case of the system disclosed in the fourth publication, particularly, the location of interest to the user is merely enlarged and displayed on a map, but, since the display itself does not include changes in the location of interest, such as new roads, the user can easily get confused. In addition, an external storage unit is required for storing the map base, raising the cost of the system and increasing the size thereof.

In the case of the system disclosed in the fifth publication, there is a problem in that the number of wild cards may be entered incorrectly in the case of a long string of characters. Other problems include a long search time of a large data base for the name of a location in a server shared by a plurality of terminals, and, hence, a long wait time which makes the user impatient.

The first Internet technique has a problem in that, when the literal (written) phonetic transcription of the name of a place does not exactly match its stored spelling, candidates for the name of the place can not be displayed. Take "Oomikacho, Hitachi-city, Ibaraki Prefecture" as an example of a stored spelling. If the user incorrectly enters a literal input "Hitachi-city Oomika" or "Oomikamura, Hitachi-city", the display for the place will not appear since the lateral input does not exactly match the stored spellings. Thus, the first Internet technique has a problem in that an incorrect human input can not be handled.

As for the second Internet technique, the service of displaying the map of a destination based on picture data entails a large amount of information which takes a long time to download and increases the communication charge.

SUMMARY OF THE INVENTION

It is thus an object of the present invention, in addressing the problems described above, to provide an information providing system which comprises a server and a terminal mounted on a vehicle and which is capable of rendering services by presenting a map from the server to the terminal with a higher degree of efficiency and at a lower cost.

It is another object of the present invention to provide a means for preventing the communication load between a server and a terminal from increasing.

It is still another object of the present invention to provide a means capable of optimizing the time needed to download information from the server to the terminal in an information providing system.

It is a further object of the present invention to provide an information providing system with low costs of communication of map information on routes from the position of the terminal to a destination, short times to search a data base for desired information and an easy operation to enter the name of a place.

It is a still further object of the present invention to provide an information providing system which comprises a server and a terminal mounted on a vehicle which and is capable of displaying the map of a destination with a higher degree of efficiency and at a lower cost.

In order to achieve the objects described above, the information providing system of the present invention a terminal mounted on a vehicle and used for providing a route guide showing directions to a destination, a server for providing information including at least a map used in the route guide showing directions to the terminal and an information providing timing determination means in either the server or the terminal for determining timing to transmit information, including at least the map, from the server to the terminal.

The information providing timing determination means keeps track of the position of the vehicle in which the terminal is mounted to determine typically a time at which the vehicle arrives at a predetermined location as timing to download information including at least the map from the server to the terminal. As an alternative, the information providing timing determination means uses at least one piece of information on usable resources in the terminal at that time and information on a guide route leading to a destination to determine the timing needed to transmit information, including at least the map, from the server to the terminal.

In order to achieve the objects described above, either the server or the terminal employed in the information providing system of the present invention is provided with a means for computing quantities of information, including at least the map, in accordance with information on resources available at that time in the terminal, and the server generates information to be transmitted to the terminal on the basis of the computed information quantities.

Also, in order to achieve the objects described above, in the information providing system of the present invention which comprises a terminal for providing a route guide showing directions to a destination and a server for providing information including at least a map and names of places used in the route guide showing directions to the destination, the server is further provided with an index candidate place name providing means for executing the steps of receiving a string of characters entered by the user to the terminal and transmitted by the terminal to the server, wherein the string of characters represents a portion of the place name of a destination to be used in the route guide showing directions to the destination, searching a data base of place names by using an index formed from the string of characters for candidates for the place name of the destination matching the string of characters transmitting the candidate place names to the terminal and requesting the terminal to select one of the candidate place names, and a map providing means for transmitting to the terminal a map for a selected candidate for the place name of the destination, which is transmitted by the terminal to the server.

BRIEF DESCRIPTION OF THE DRAWINGS

FIG. 22 is a flowchart representing processing to search a dictionary for a destination; and FIG. 23 is a diagram of other typical operations to enter the name of a place.

DESCRIPTION OF THE PREFERRED EMBODIMENTS

Some preferred embodiments of the present invention are explained with reference to the drawings.

Figure 13:
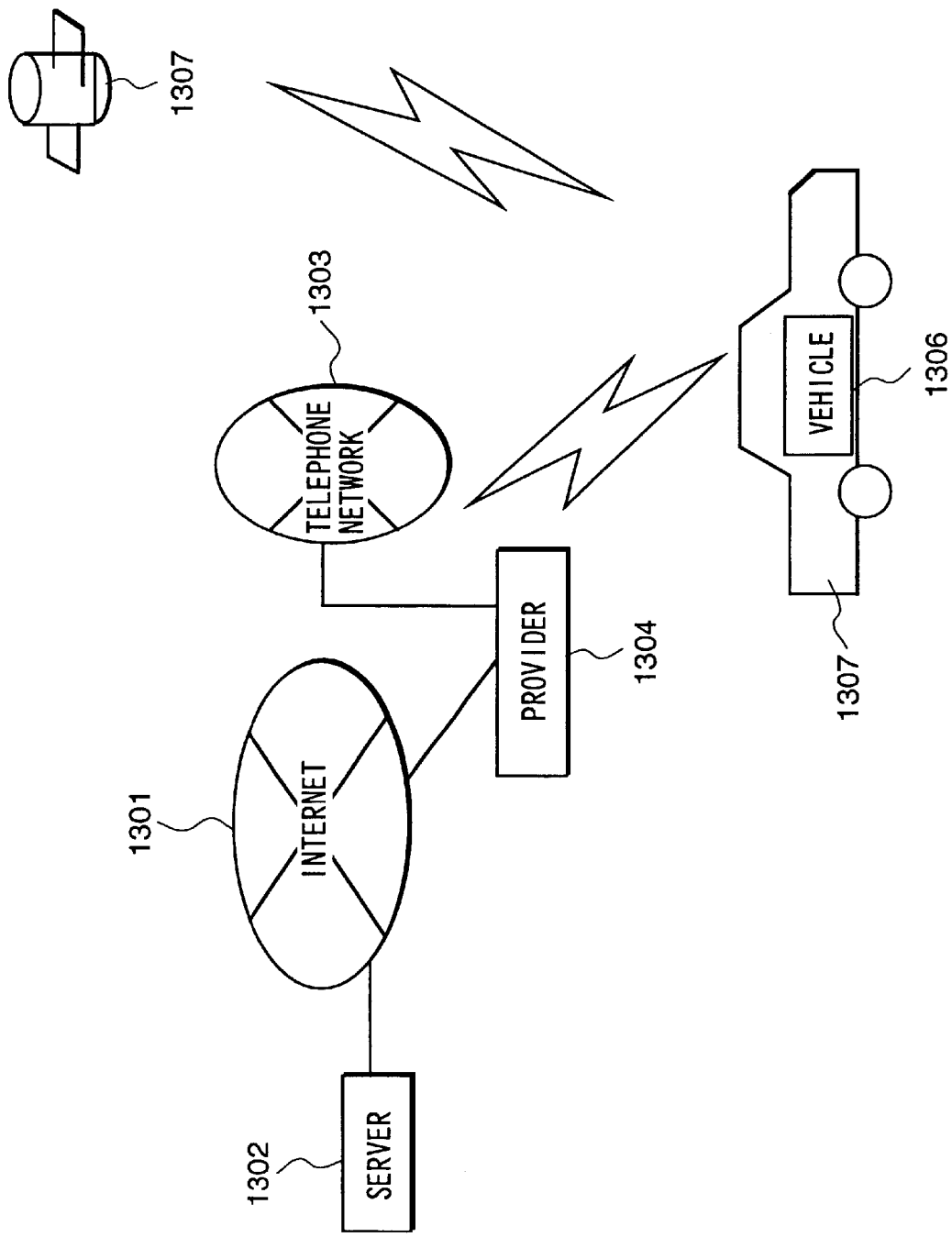
FIG. 13 is a diagram showing a typical configuration of the information providing system provided by the present invention.

FIG. 13 is a diagram showing a typical configuration of an information providing system according to the present invention. As shown in the figure, in the information providing system implemented by an embodiment of the present invention, a server 1302 and a provider 1304 are connected to an Internet network 1301. Mounted on a vehicle 1305, a terminal 1306 operates to identify the present position of the vehicle by receiving a signal from a GPS satellite 1307. The server 1302 provides the terminal 1306 with a map in accordance with a request made by the terminal 1306. The terminal 1306 makes such a request by first establishing connection with the provider 1304 through a telephone network 1303 and then accessing to the Internet network 1301 via the provider 1304. A map typically related to the present position of the terminal 1306 is finally downloaded from the server 1302 to the terminal 1306.

Figure 1:
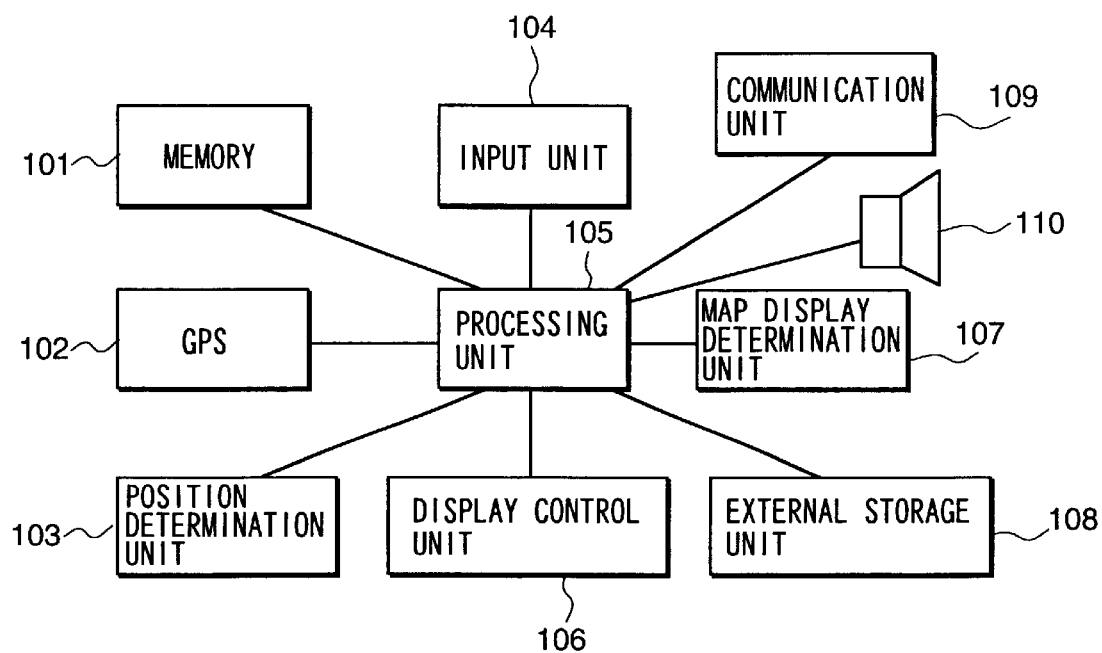
FIG. 1 is a block diagram showing a typical configuration of a terminal provided by the present invention.

FIG. 1 is a block diagram showing a typical configuration of the terminal 1306 provided by the present invention.

As shown in FIG. 1, the terminal 1306 comprises a memory 101, a GPS unit 102, a position determination unit 103, an input unit 104, a processing unit 105, a display control unit 106, a map display determination unit 107, an external storage unit 108, a communication unit 109 and an audio output unit 110.

The terminal 1306 receives data from the server 1302 through the communication unit 109. The data received from the server 1302 is stored in the memory 101 or the external storage unit 108 for later use.

The GPS unit 102 determines the present position of the vehicle 1305 by measuring the latitude and the longitude of the present position of the vehicle 1305. The position determination unit 103 identifies what road and what place the vehicle 1305 located at on the basis of the latitude and the longitude of the present position of the vehicle 1305 computed by the GPS 102. That is to say, the position determination unit 103 maps the latitude and the longitude of the present position of the vehicle 1305 onto a map.

The map display determination unit 107 forms a judgment as to whether or not the present position is a location at which to download a map.

The display control unit 106 transfers data to be displayed to a display unit which is typically an instrument already installed in the vehicle 1305. It should be noted that, while the terminal 1306 of the present embodiment does not have a display unit, the terminal 1306 can also be configured to include a display unit.

The input unit 104 is used for inputting information, such as a destination. In general, a remote controller is used as the input unit 104. In place of a remote controller, however, a tablet for inputting hand-written data can also be used. The audio output unit 110 outputs a voice message originated by the terminal 1306 or the server 1302.

Next, processing operations carried out by the terminal 1306 and the server 1302, will be explained with reference to the flowchart shown in FIG. 2.

As shown in the figure, the flowchart begins with a step 201 at which the GPS 102 employed in the terminal 1306 calculates the position of the vehicle 1305. The flow of the processing then goes on to a step 202 at which literal information on a destination entered by the user by operating the terminal 1306 is stored in the memory 101 or the external storage unit 108.

The reason why the literal information on a destination is kept in the terminal 1306 is that it is not necessary for the user to spend time and labor to reenter such information in case the engine of the vehicle 1305 is restarted after being once halted in the middle of the route leading to the destination. The need to reenter literal information on a destination in case the engine of the vehicle 1305 is restarted after being once halted is a load borne by the user. In addition, it is also a burden to the user to again set literal information on a destination for use in recalculation of a route in case the vehicle 1305 has slipped off from the original route. The fact that literal information on a destination is kept in the terminal 1306 also indicates that the vehicle 1305 is running on a route leading to the destination, since a destination is deleted from the terminal 1306 as soon as the vehicle 1305 arrives at the destination, as will be described later. On the other hand, the fact that literal information on a destination is no longer kept in the terminal 1306 indicates that the vehicle 1305 is no longer running on a route leading to the destination. In this case, it is necessary to newly set a destination.

At a step 203, the position of the vehicle 1305 and the literal information on the destination are transmitted to the server 1302 by using the communication unit 109. In this case, a portable telephone may be used as the communication unit 109. The terminal 1306 has a function to automatically make a telephone call to the server 1302 at that time and to automatically terminate the call at the end of the data transmission.

At a step 218, the server 1302 receives the position of the vehicle 1305 and the literal information on the destination, and commences to search a destination place-name data base for a destination corresponding to the literal information. It should be noted that, if a plurality of candidates for the destination are found in the search, the server 1302 transmits the candidates to the terminal 1306 and then receives information on a selected candidate for the destination from the terminal 1306. Details of the search of the data base for a destination will be explained later with reference to FIG. 23. It is also to be noted that the position of the vehicle 1305 transmitted by the terminal 1306 to the server 1302 is the latitude and the longitude of the position of the vehicle 1305. On the other hand, the user of the terminal 1306 typically enters the literal place name of a destination to be transmitted to the server 1302 as described above. In this case, the candidate place name of the destination eventually selected by the user is converted by the server 1302 into a latitude and a longitude of the destination represented by the selected candidate place name. As an alternative, the user may also enter the latitude and the longitude of the destination directly to the terminal 1306 to be transmitted by the terminal 1306 to the server 1302 in place of the literal place name of the destination. In this case, the operation to search the destination place-name data base for candidate place names and to let the user select one of the candidates can be eliminated.

At a step 209, information on a route leading to the determined destination is computed. At a step 210, the server 1302 computes a location to display as a map on the terminal 1306. A location to display as a map is referred to hereafter as a map display location. An example of the map display location is a crossing at which the vehicle 1305 will make a turn. If the vehicle 1305 goes straight along a road through a crossing, however, it is not necessary to download a map. Such a crossing is not regarded as a map display location.

In addition to a crossing, an interchange where the vehicle 1305 gets off from an expressway may also be a map display location. The start of a road with a name different from the present road is also a map display location. In an existing navigation system, a map display location can be found by using a technique for recognizing a crossing at which the vehicle 1305 will make a turn.

At a step 211, the server 1302 transmits the information on a route computed at the step 209 and the map display location found at the step 210 to the terminal 1306.

At a step 204, the terminal 1306 receives the computed information on the route and the identified map display location from the server 1302, and stores them in the memory 101. The received information on the route is used to determine if the vehicle 1305 has slipped off the route. At this step, the preparatory work has been completed.

While the vehicle 1305 is running, the GPS 102 keeps measuring the position of the vehicle 1305 at a step 205 and processing is carried out in accordance with the newly measured position. To be more specific, the present position of the vehicle 1305 is examined to determine whether or not the position is the map display location, an enlarged-map display location, a destination or another location. If the vehicle 1305 is determined to have slipped out from the selected route, the flow of the processing goes back to the step 203.

If the present position of the vehicle 1305 is determined to be in the vicinity of the map display location or the enlarged-map display location, the flow of the processing goes on to a step 213 at which the terminal 1306 requests the server 1302 to transmit a map of the vicinity of the map display location or an enlarged map of the enlarged-map display location to the terminal 1306 through the communication unit 109. More specifically, as the vehicle 1305 is approaching the map display location or the enlarged-map display location, the terminal 1306 automatically makes a telephone call to the server 1302, requesting the server 1302 to transmit the map. At a step 214, the server 1302 searches a map data base for the requested map. At a step 215, the server 1302 further determines the type of the requested map to be transmitted to the terminal 1306. If the type is found to be a default type, the flow of the processing goes on to a step 216 at which the map is transmitted to the terminal 1306 at the default scale. If the type is found to be an enlarge type, on the other hand, the flow of the processing goes on to a step 217 at which an enlarged map is transmitted to the terminal 1306.

The terminal 1306 receives the map or the enlarged map transmitted by the server 1302 at a step 206 or 207, and displays the map or the enlarged map on a display unit, not shown in the figure, through the display control unit 106. The enlarged map needs to be displayed when the terminal 1306 is approaching the enlarged-map display location, when such an enlarged map has been requested. In either case, the terminal 1306 automatically terminates the telephone call at the end of the map transmission and the server 1302 identifies the user using the terminal 1306 from the telephone number of the call.

With regard to a function to display an enlarged map, the terminal 1306 is capable of enlarging a map provided that the map is available as vector data. If the map is formed by image data, on the other hand, the terminal 1306 is not capable of enlarging the map. In this case, the terminal 1306 must specify an enlarged map in the request for a map made at the step 213 to the server 1302.

If the present position is the destination, the flow of the processing goes on to a step 212 at which the destination and information on a route leading to the destination are erased. The processing is then ended.

If the present position is neither the map display location, the enlarged-display location, nor the destination, the flow of the processing goes on to a step 208 at which the display appearing on the display unit is erased.

That is to say, if the vehicle 1305 is at a position separated from the map display location, the enlarged display location and the destination, nothing needs to be displayed. However, information on landmarks close to the position of the vehicle 1305 can be left on the display screen even if other items are erased.

In addition, a map does not necessarily have to be downloaded from the server 1302 to the terminal 1306, even if the vehicle 1305 is approaching a map display location.

Figures 16, 17:
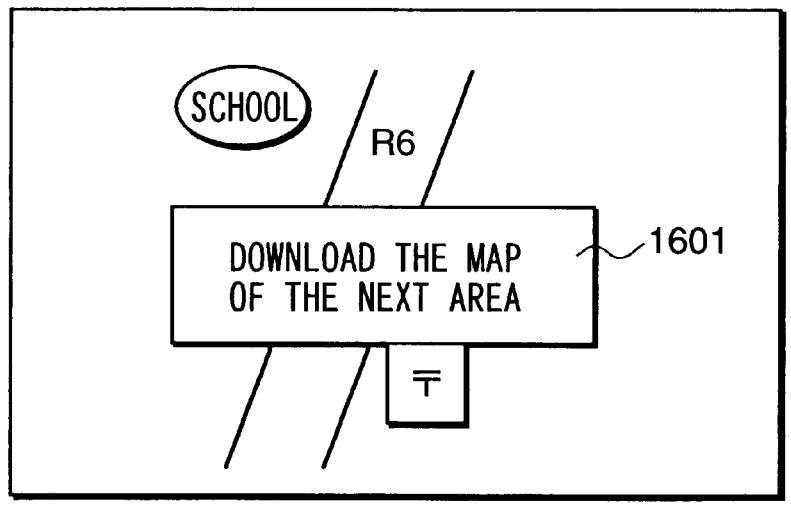
FIG. 16 is a diagram showing a typical screen before downloading of a map.
FIG. 17 is a diagram showing a typical table of definitions of priority levels.

For example, a notice to download a map is given to the user of the terminal 1306 as the vehicle 1305 arrives at a position approaching the map display location. A typical technique which may be used to give such notice is to display a window 1601 as shown in FIG. 16. Accompanying the window 1601, the terminal 1306 may issue an oral message saying: "The map of a next area will be downloaded." If the user does not react to the window 1601 and the oral message, the terminal 1306 starts an operation to download the map. If the user reveals an intention to cancel the downloading of the map by entering a command via the input unit 104, on the other hand, the terminal 1306 does not download the map. Typically, a remote controller is used as the input unit 104.

Figure 2:
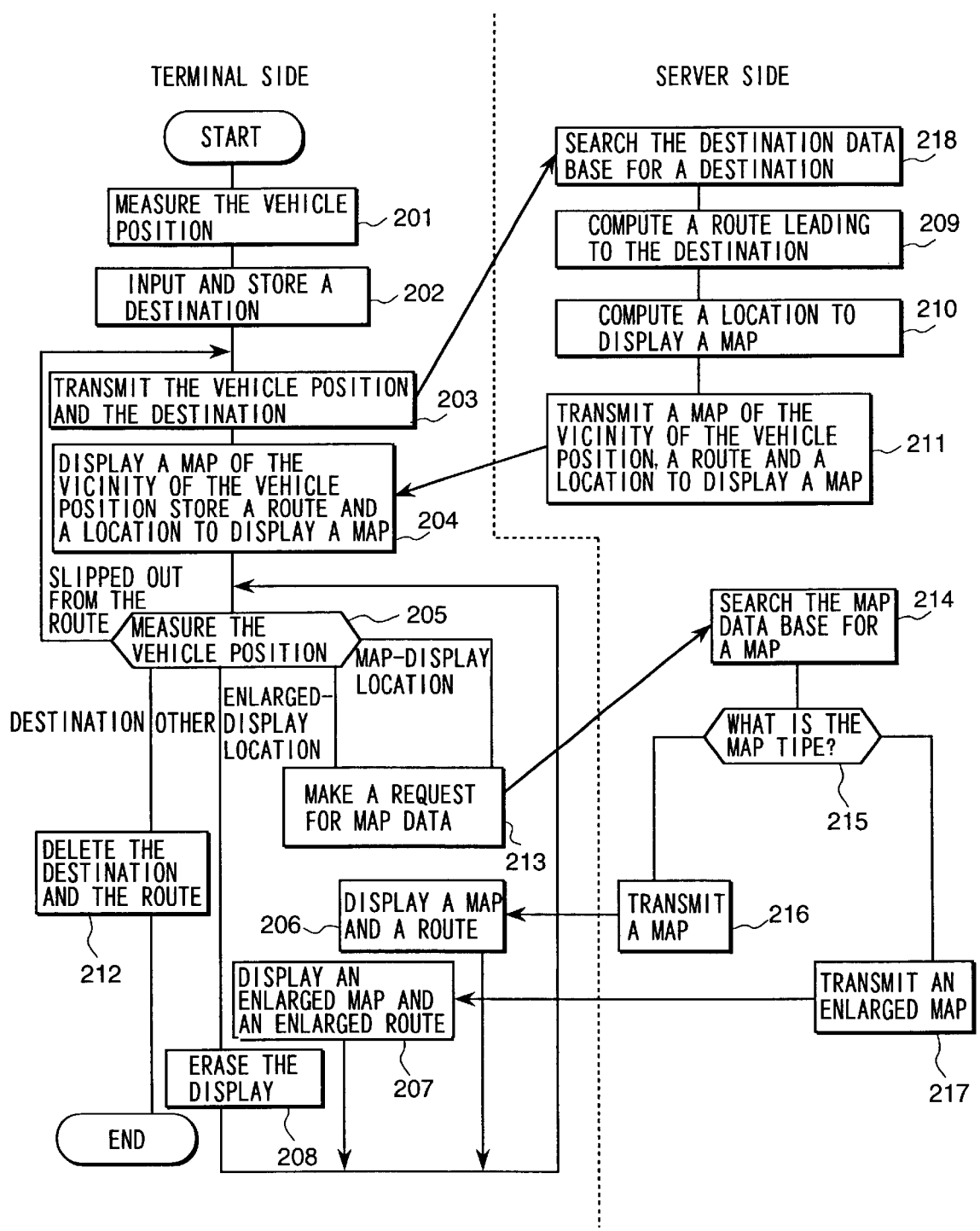
FIG. 2 is a flowchart representing typical operations carried out by a terminal and a server provided by the present invention.

It should be noted that the processing represented by the flowchart shown in FIG. 2 is carried out with the power supply of the terminal 1306 turned on. The power supply of the terminal 1306 may be turned off when the engine of the vehicle 1305 is halted, for example at a rest area on the route. When the engine is restarted, the terminal 1306 checks to determine whether or not a destination is stored therein. A destination stored in the terminal 1306 indicates that the vehicle 1305 has not arrived at the destination. In this case, the processing is resumed from the step 205. If no destination is stored in the terminal 1306, on the other hand, the processing is resumed from the step 2017.

Figure 3:
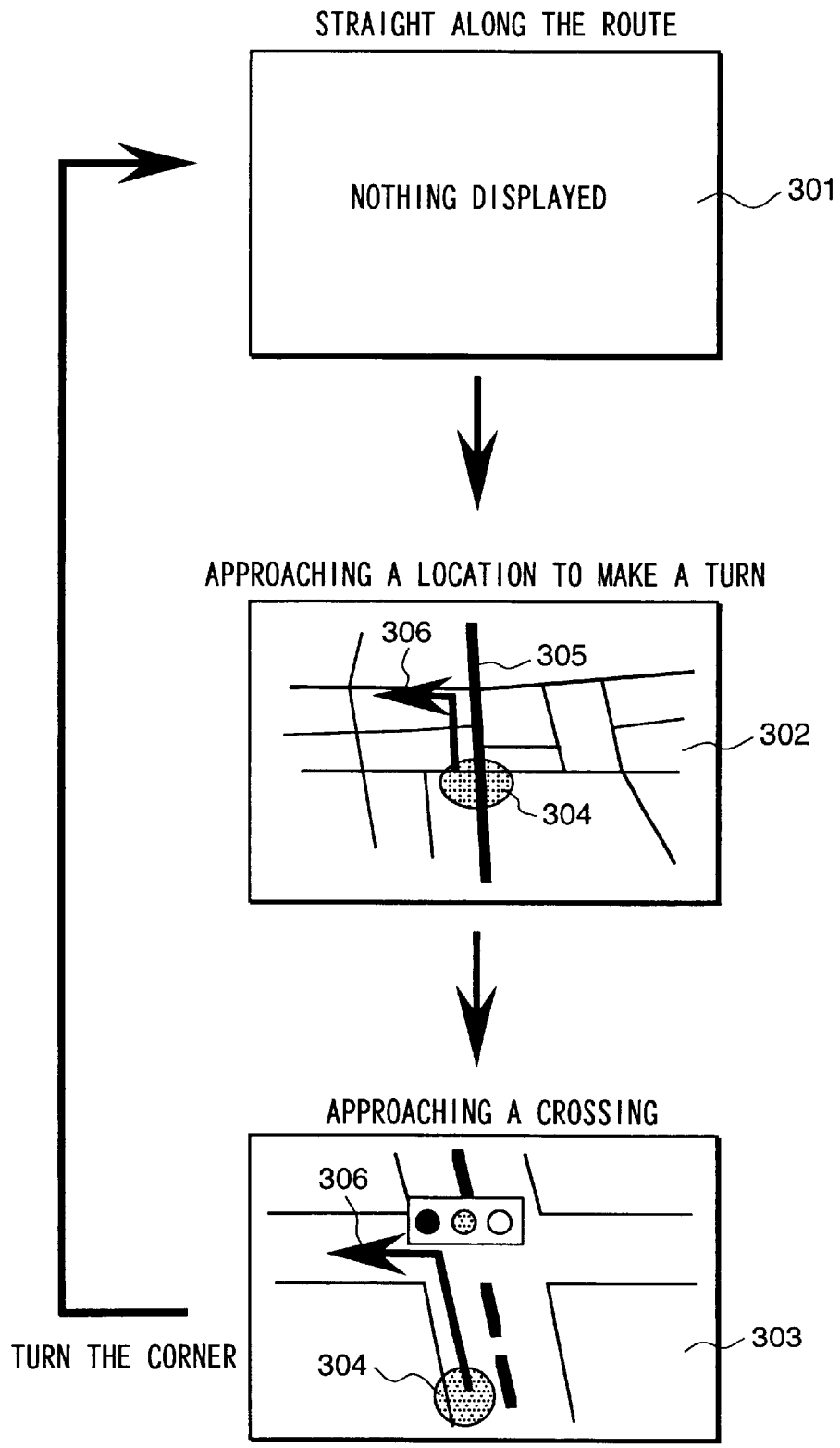
FIG. 3 is a diagram showing typical transitions of a display screen generated by the processing of the present invention.

FIG. 3 is a diagram showing typical transitions of a display screen generated by the processing of the present invention.

A screen 301 is a typical display showing the vehicle 1305 running straight along a road. The screen 301 does not show anything. Landmarks in close proximity to the position of the vehicle 1305 can be displayed. An example of a landmark is a restaurant. In addition, information on a restaurant, such as its menu and food prices, can also be displayed on the display unit as well.

A screen 302 is a typical display showing a map of a map display location 305 approached by the vehicle 1305. The terminal 1306 determines whether or not the vehicle 1305 is approaching a map display location 305 by comparing the distance between the position 304 of the vehicle 1305 and the map display location 305 with a predetermined length. It is of course possible to compute the distance between the map display location 305 and the position 304 which is found by the GPS 102. In this embodiment, a direction to be followed by the vehicle 1305 is also displayed as shown by an arrow 306. As shown by the screen 302, the vehicle 1305 is supposed to make a left turn at the map display location 305.

As the vehicle 1305 further approaches the map display location 305, an enlarged map of the vicinity of an intersection at the map display location 305 is displayed as shown on a screen 303. The screen 303 also displays the position 304 of the vehicle 1305 and the arrow 306. As described earlier, an enlarged map can be produced by the terminal 1306 in case vector data has been received by the terminal 1306. In the case of image data, however, an enlarged map needs to be downloaded from the server 1302.

After the enlarged map is displayed, the vehicle 1305 makes a left turn at the crossing and the screen 303 disappears from the display unit, ending the display of the map. Then, as the vehicle 1305 is running straight along a road again, the screen does not show anything except probably landmarks in close proximity to the position of the vehicle 1305. As an alternative, a rough map like one shown in FIG. 11 can be displayed. This screen is displayed for a straight run in place of the screen 301 described above.

In order to display information on a landmark approached by the vehicle 1305, it is necessary for the terminal 1306 to know the location of the landmark in advance. It is thus necessary to acquire information on the location from the server 1302 beforehand. Then, the terminal 1306 keeps track of the position of the vehicle 1305 and forms a judgment as to whether or not the vehicle 1305 has approached the landmark.

Figure 4:
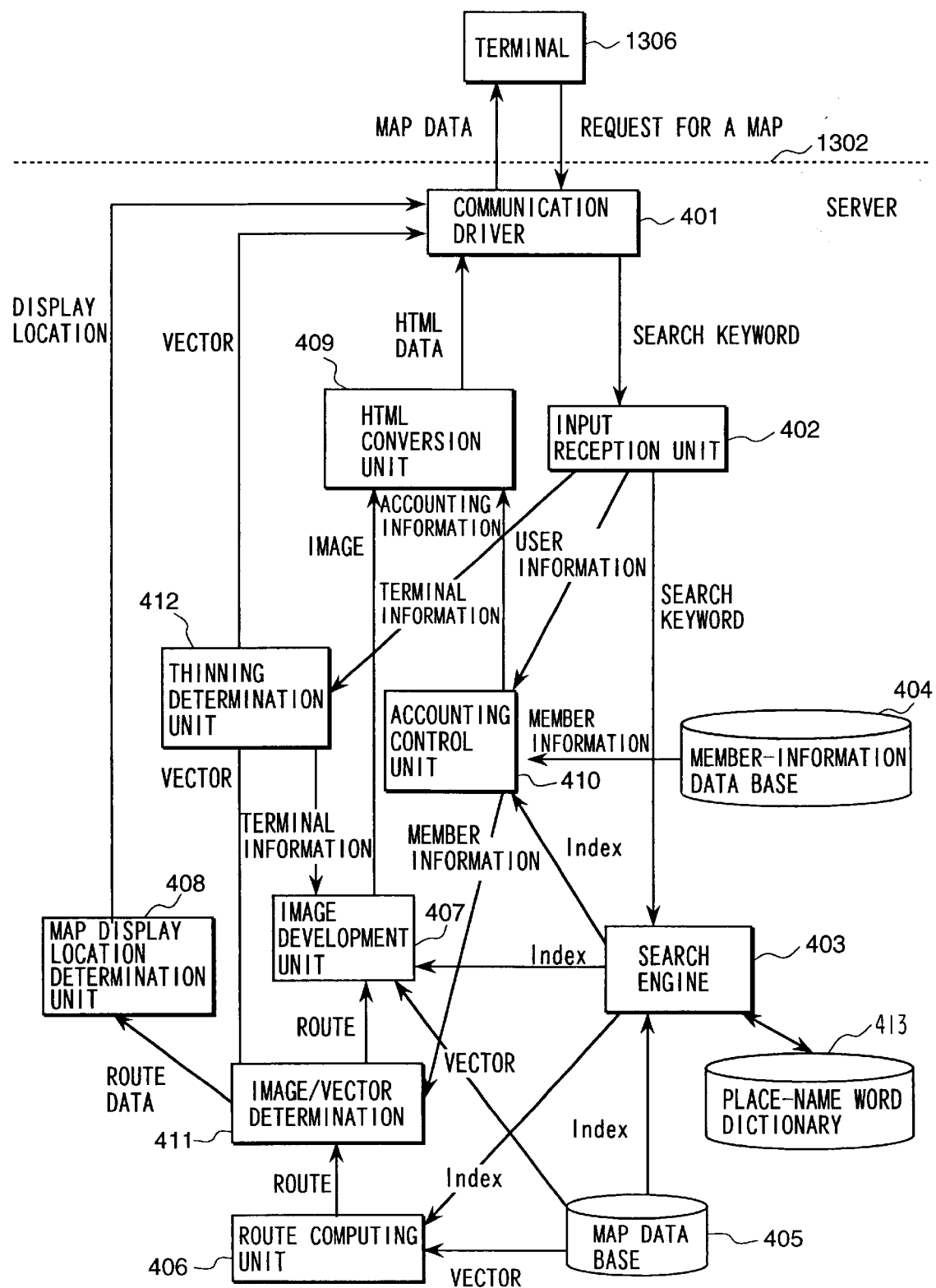
FIG. 4 is a block diagram showing a typical configuration of the server provided by the present invention.

FIG. 4 is a block diagram showing a typical configuration of the server 1302 provided by the present invention.

As shown in the figure, the server 1302 comprises a communication driver 401, an input reception unit 402, a search engine 403, a member-information data base 404, a map data base 405, a place-name word dictionary 413, a route calculation unit 406, an image development unit 407, a map display location determination unit 408, an HTML conversion unit 409, an accounting control unit 410, an image/vector determination unit 411 and a thinning determination unit 412.

In the server 1302, all requests made by the terminal 1306 are received by the communication driver 401. Data received by the server 1302 is examined by the input reception unit 402 to determine what kind of data it is.

When member information is received, the input reception unit 402 determines whether or not the member has a right to make an access to the server 1302. If the member does not have such a right, the terminal 1306 is notified that no further services can be rendered. As an alternative, only image data can be provided to such a member.

User information is supplied to the accounting control unit 410 which searches the member-information data base 404 for member information matching the user information and determines which member is supposed to pay the cost of communication. The ID of the member is stored in the terminal 1306.

When information on the position of the vehicle 1305 and a destination is received from the user of the terminal 1306, the information is supplied to the input reception unit 402 of the server 1302 by way of the communication driver 401 as is the case with the user information described above. The information on the position of the vehicle 1305 is the latitude and the longitude of the position. By the same token, the information on a destination is the latitude and the longitude of the destination which can be a result of conversion of the name place of the destination or obtained directly from the terminal 1306 as described above. In the case of a destination, the long-distance prefix of a telephone number or the zip code of the destination can be used instead of the latitude and the longitude thereof In this case, the long-distance prefix telephone number or the zip code of the destination must be converted into the latitude and the longitude thereof, typically by the input reception unit 402.

The input reception unit 402 transfers the position of the vehicle 1305 and literal information on the destination to the search engine 403. The search engine 403 searches the place-name word dictionary 413 for the latitude and the longitude of the destination matching the literal information. Then, the search engine 403 searches the map data base 405 for a map matching the latitude and the longitude. The search engine 403 then outputs an index in the map data base 405 for the storage address of a mesh including the map of the destination. The map data base 405 can be an ordinary map data base of the type generally used. It is desirable, however, to have a map data base that can be used for storing vector map data.

The index obtained in the search is transferred to a route computing unit 406 which computes a route from the position of the vehicle 1305 to the destination. The computed route is then transferred to the map display location determination unit 408 which determines a location at which the map is to be downloaded to the terminal 1306.

The image/vector determination unit 411 for determining the type of the map to be transmitted to the terminal 1306 determines whether to transmit an image date map or a vector data map to the terminal 1306 in dependence on whether or not the user is a member. If the user is a member, a vector data map is transmitted to the terminal 1306. Otherwise, an image data map is transmitted The terminal 1306 is capable of enlarging and shrinking a vector map with a high degree of freedom. Thus, even if the user desires a map with a scale different from that of the map received by the terminal 1306 from the server 1302, it is not necessary to again download the desired map from the server 1302. As a result, the communication load is reduced.

If the user is a member, route information is generated by the route computing unit 406 from the index output by the search engine 403. The route information and a vector data map read out from the map data base 405 are supplied to the communication driver 401 which passes them on to the terminal 1306. If the user is not a member, on the other hand, the image/vector determination unit 411 transfers the index in the map data base 405 and the route information to the image development unit 407 which generates image data. The image data forms a map with the route displayed thereon. The image data generated by the image development unit 407 is converted into HTML data by the HTML conversion unit 409. The HTML data is then transmitted by the communication driver 401 to the terminal 1306.

When data is transmitted to the terminal 1306, the accounting control unit 410 computes a charge to the member. For example, there is no charge for an image data map, but there is a charge for a vector data map.

In the case of an image data map, a function for enlarging and shrinking a map in the terminal 1306, if any, can hardly be used effectively. Thus, in a transition from the screen 302 to the screen 303 shown in FIG. 3, for example, an image data map for the latter which is different from that for the former needs to be downloaded, increasing the communication load, hence, raising the communication charge. In order to solve this problem, the information providing system can be designed into a configuration wherein, in the presentation of an image data map, only a burden of a communication charge is borne by the user and there is no service charge.

On the other hand, a vector data map can be enlarged and shrunk by the terminal 1306 with a high degree of freedom, once the vector data map has been downloaded. Thus, in a transition from the screen 302 to the screen 303 shown in FIG. 3, for example, it is not necessary to again download the map. As a result, the communication charge is reduced. In addition, if the map data also includes information for allowing the map to be displayed three-dimensionally, a three-dimensional display of the map can be obtained, making the displayed map easy to visualize. Therefore, a service charge to the user who receives a vector data map is justified.

A contemporary technology called Birdview can be adopted in displaying a map three-dimensionally. With this technology, two-dimensional information is displayed to provide the viewer with a sense of viewing the display from a position above the displayed object in a slanting direction. The Birdview technology has been put to practical use in existing car navigation systems. The technology can be applied to map data received from the server 1302.

Figures 8, 9:
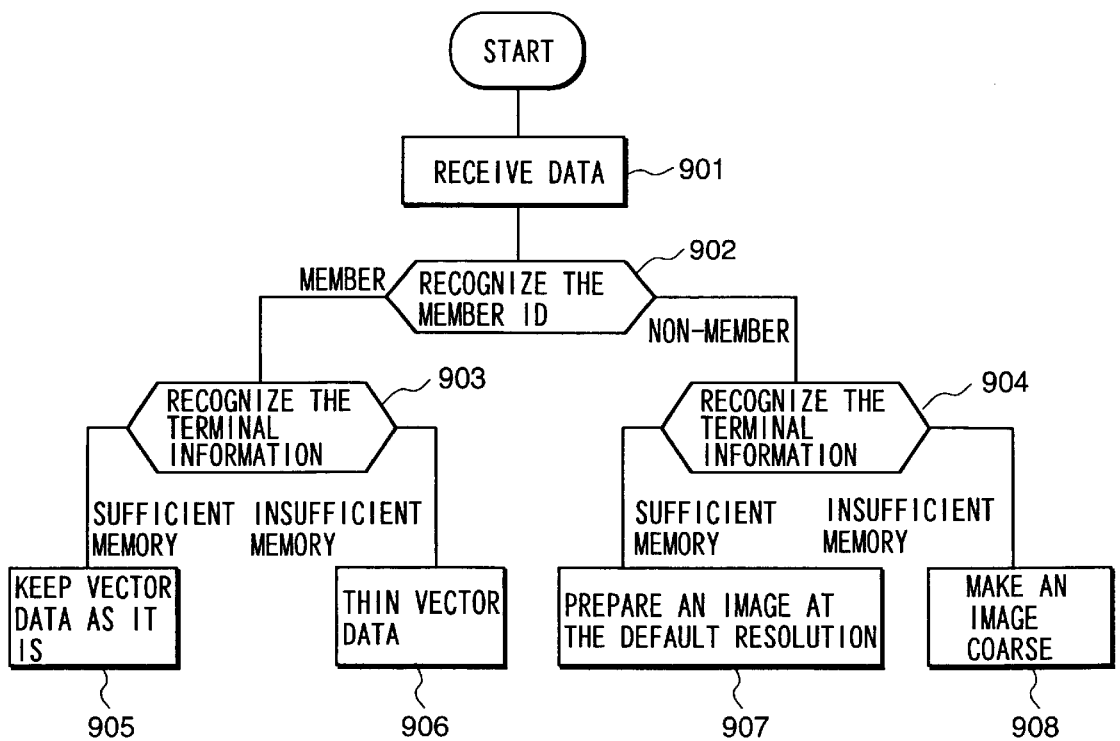
FIG. 8 is an explanatory diagram showing accounting information revealed to a member.
FIG. 9 is a flowchart representing typical operations up to transmission of vector data or image data.

FIG. 8 is an explanatory diagram showing typical accounting information stored in the accounting control unit 310.

As shown in the figure, each row of the accounting information includes a member ID 801, a data amount 802, a map type 803 and an access date and time 804. The accounting information allows an amount of money charged to the user to be computed on a deadline. The amount of money is then transmitted to a financial institution entering into a contract with the user. In the financial institution, the amount of money is automatically drawn from the account of the user to pay the communication and service charges.

Figure 5A:
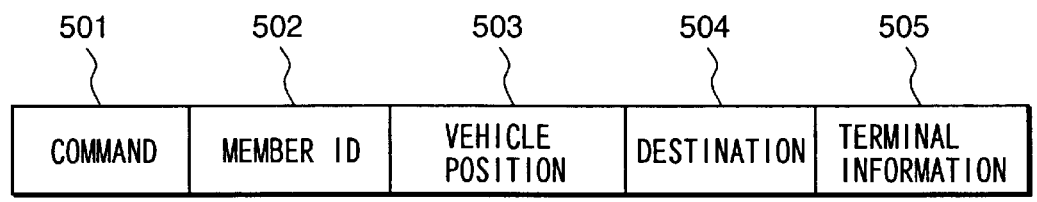
FIG. 5(a) is an explanatory diagram showing a protocol adopted to transmit data from the terminal to the server.
Figure 5B:
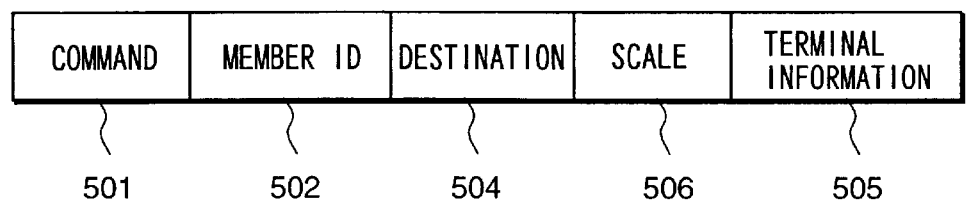
FIG. 5(b) is an explanatory diagram showing another protocol adopted to transmit data from the terminal to the server.

Data transmitted by the terminal 1306 to the server 1302 includes information on the member, the position of the vehicle 1305 and a destination. FIGS. 5(*a*) and 5(*b*) are explanatory diagrams showing a protocol adopted to transmit data from the terminal 1306 to the server 1302. To be more specific, FIG. 5(*a*) is an explanatory diagram showing a protocol adopted to transmit the position of the vehicle 1305 and a destination from the terminal 1306 to the server 1302. In this case, a command 501, a member ID 502, a vehicle position 503, a destination 504 and terminal information 505 are transmitted as a packet. On the other hand, FIG. 5(*b*) is an explanatory diagram showing a protocol adopted to transmit a request for a map from the terminal 1306 to the server 1302. In this case, a command 501, a member ID 502, a destination 504, terminal information 505 and a map scale 506 are transmitted as a packet.

According to these protocols, a command 501 is placed at the beginning of a packet. A command is typically a request for calculation of a route or a request for a map. A command may be identified by a 1-byte character code. A member ID 502 is also required in the data transmitted to the server 1302. As an alternative, the number of the portable telephone can be used in place of a member ID 502.

In the case of a command making a request for computation of a route, the command 501, a member ID 502, a vehicle position 503, a destination 504 and terminal information 505 are transmitted to the server 1302 as a packet. The member ID 502 is the identification of the member which has a right to receive a vector map from the server 13072. If the member does not have such a right, the member ID 502 is set at a value that is never used as an ID. An example of such a value is a negative number. The vehicle position 503 is represented by a latitude and a longitude. On the other hand, while the destination 504 can be a latitude and a longitude, the destination 504 is typically entered by the user as a literal input. In this case, the lateral input is converted into a latitude and a longitude at the step 218 of the flowchart shown in FIG. 2 as described earlier.

In the case of a command making a request for a map, on the other hand, the command 501, a member ID 502, a destination 504 and a map scale 506 are transmitted to the server 1302 as a packet. The member ID 502 and the destination 504 are the same as those of a command making a request for computation of a route. The map scale 506 indicates the height and the width of a map expressed in terms of meters.

The server 1302 carries out processing in accordance with a command placed at the head of a packet received from the terminal 1306.

Figure 6:
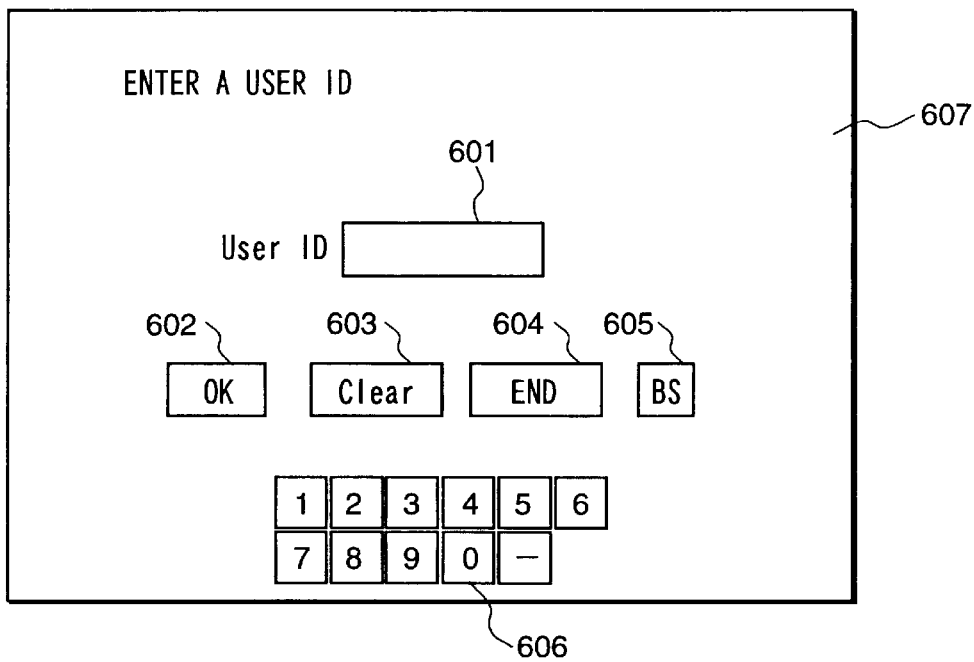
FIG. 6 is a diagram showing a typical screen for receiving a user ID input.

The member ID 502 is entered only once to a screen like one shown in FIG. 6 when the terminal 1306 is started. The member ID 502 is entered by operating the ten keys 606 shown at the bottom of the screen. An entered number is shown on an ID field 601 and, as an OK button 602 is clicked, the number is stored in the memory 101. If a clear button 603 is clicked, on the other hand, the display on the ID field 601 is erased. If an end button 604 is clicked, the member ID 502 stored in the terminal 1306 is deleted. A BS button 605 is the so-called back-space button which is clicked to erase the right most digit of a number displayed on the ID field 601.

When the OK button 602 is clicked without entering a member ID 502, a negative number is stored in the memory 101 as a member ID. If a member ID 502 is not entered, the number of a portable telephone used as the communication unit 109 can serve as a substitute for the member ID 502.

Figures 11, 12:
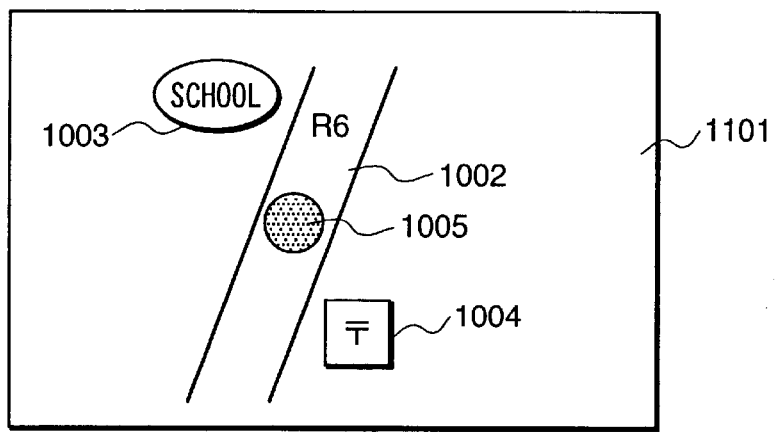
FIG. 11 is a diagram showing a map display of main points.
FIG. 12 is an explanatory diagram showing typical information stored in a member-information data base.

FIG. 12 is an explanatory diagram showing typical information on members stored in a member-information data base 404. As shown in the figure, the information on a member includes the name 1201 of the member, a member ID 1202, a portable-phone number 1203, a financial-institution name 1204 and a contact 1205.

A member ID 1202 is issued by the service center in advance prior to the use of the information providing system. The portable-telephone number 1203 is the number of a portable telephone used as the communication unit 109. The portable-telephone number 1203 is used in place of the member ID 1202 in case no member ID is issued. If no member ID is issued, it is necessary to store the portable-telephone number 1203 in the member data base 404. If the member ID 1202 is issued, on the other hand, the portable-telephone number 1203 does not have to be stored in the member data base 404. A financial-institute name 1204 is the name of a financial institute entering into a contract with the user. The financial institute is an institute where money can be drawn from the user's account to pay a service charge. If the user pays money into the financial institution for the service charge, however, it is not necessary to withdraw it from the institution. A contact 1205 is the address and the home telephone number of the user. A service-charge bill and a receipt are sent to this address.

Figure 7:
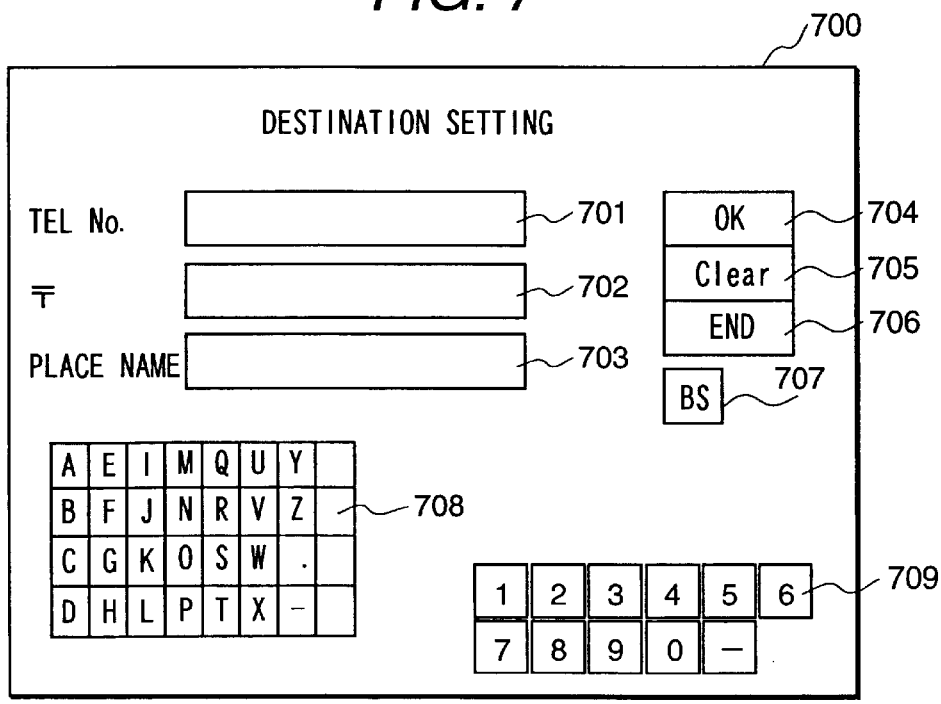
FIG. 7 is a diagram showing a typical screen for receiving a destination input.

FIG. 7 is an explanatory diagram showing a typical screen for receiving information on a destination. While information on a destination is normally entered as the place name of the destination as described above, the information on a destination can also be entered as the long-distance prefix of a telephone number or the zip code of the destination. The long-distance prefix of the telephone number or the zip code of a destination is entered to a field 701 or 702. On the other hand, the place name of a destination is entered to a field

703. It is not necessary to enter all of the place name of the destination, the long-distance prefix of the telephone number, the zip code and the latitude & the longitude of the destination, but, instead, one of them is sufficient. It is also possible to provide an AND-search function to search a data base by using all of the place name of the destination, the long-distance prefix of the telephone number and the zip code of the destination. It should be noted that the long-distance prefix of a telephone number and a zip code may be entered by operating the ten keys 709.

The name place of a destination is entered by operating the character keys 708. In this embodiment, a name place can be entered partially, or a name place including an unnecessary extra part is also acceptable, as will be described in detail later. Take "Oomikacho, Hitachi-city, Ibaraki Prefecture" as an example of a stored correct spelling. In this case, "Hitachi-city Oomika" with a different order from the stored spelling or "Hitachi Oomikamura" with an unnecessary extra part is acceptable for use to correctly search the data base for "Oomikacho, Hitachi-city". Details of the search engine 403 will be described later with reference to FIGS. 18 to 23.

The following description relates to a case in which resources such as a memory of the terminal 1306 become insufficient. In this embodiment, the server 1302 carries out a thinning process on map data before transmission of the data to the terminal 1306 in case resources such as a memory of the terminal 1306 become insufficient.

When making a request for a map to the server 1302, the terminal 1306 also transmits information on resources in the terminal 1306 along with the request. If there is no resource problem in particular, however, no information on resources needs to be transmitted. If the free area in the memory employed in the terminal 1306 is not sufficient, however, a packet including the size of the free area of the memory is transmitted. This packet is processed by the input reception unit 302 as described earlier.

The thinning determination unit 312 employed in the server 1302 forms a judgment as to whether a thinning process needs to be carried out on data of a map to be transmitted to the terminal 1306 by referring to the size of the free area in the memory in information received from the terminal 1306. If a thinning process is deemed necessary, the map data is subjected to a thinning process before being transferred to the communication unit 301. In this way, a necessary service can be rendered for a terminal having a free area of such a small size in the memory that original map data can not be accommodated.

In the thinning process for vector map data, only main roads are extracted from the data to be transmitted to the terminal 1306. Thus, small roads are eliminated from the transmitted data. In the case of image map data, on the other hand, the image is transmitted with the resolution thereof reduced.

The amount of external information transmitted along with the map data can also be reduced to a value that does not lead to an incorrect guidance. An example of such external information is information related to the route guide showing directions.

FIG. 9 is a flowchart representing typical operations to determine whether to transmit vector data or image data. The flowchart shown in the figure includes a consideration as to whether the user is a member or not.

As shown in the figure, the flowchart begins with a step 901 at which the server 1302 receives data from the terminal 1306. At a step 902, the server 1302 examines the member ID to determine whether the user is a member or not. If the user is a member, the flow of the processing goes on to a step 903 at which the terminal information is checked. If the terminal information indicates that the memory of the terminal 1306 is sufficient, the flow of the processing goes on to a step 905 at which vector map data read out from the map data base 405 is transmitted as it is. If the memory is not sufficient, on the other hand, the flow of the processing goes on to a step 906 at which thinned vector map data read out from the map data base 405 is transmitted to the terminal 1306.

If the user is not a member, on the other hand, the flow of the processing goes on from the step 902 to a step 904 at which the terminal information is examined. If the terminal information indicates that the memory of the terminal 1306 is sufficient, the flow of the processing goes on to a step 907 at which image map data read out from the map data base 405 is transmitted at a default resolution. If the memory is not sufficient, on the other hand, the flow of the processing goes on to a step 908 at which the resolution of image map data read out from the map data base 405 is reduced before the map data is transmitted to the terminal 1306.

In the embodiment described above, every time data is needed, the terminal 1306 is connected to the server 1302 to acquire the data. In an alternative configuration, data can also be received as a batch after the position of the vehicle 1305 and a destination have been transmitted to the server 1302, instead of receiving data each time the data is needed. Another embodiment implementing the alternative configuration of the information providing system provided by the present invention will be explained.

Figure 10:
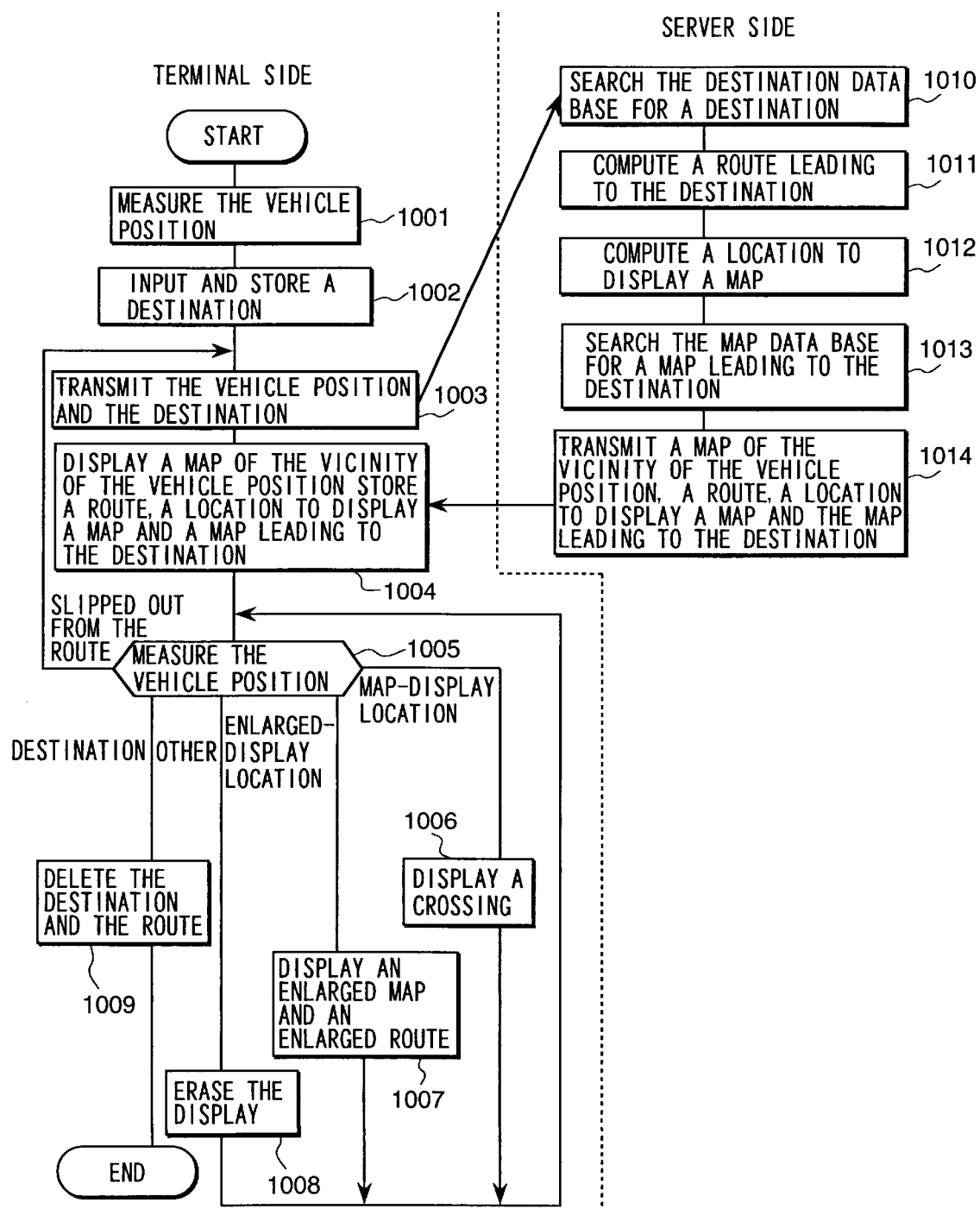
FIG. 10 is a flowchart representing typical operations carried out by the terminal and the server provided by the present invention to transmit a map as batch data.

The information providing system implemented by this other embodiment has basically the same configuration as the information providing system implemented by the embodiment described above except for processing represented by the flowchart. FIG. 10, representing typical operations carried out by the terminal 1306 and the server 1302 provided by the other embodiment to transmit a map as batch data.

As shown in the figure, the flowchart begins with a step 1001 at which the GPS 102 employed in the terminal 1306 calculates the position of the vehicle 1305. The flow of the processing then goes on to a step 1002 at which information on a destination entered by the user through the terminal 1306 is stored in the memory 101 or the external storage unit 108. At a step 1003, the position of the vehicle 1305 and the information on the destination are transmitted to the server 1302 by using typically a portable telephone to acquire a map of the destination. The above operations are the same as the counterparts in the flowchart shown in FIG. 2.

At a step 1010, the server 1302 receives the position of the vehicle 1305 and the information on the destination, and searches a destination data base for a destination corresponding to the information. At a step 1011, information on a route leading to the destination is computed. At a step 1012, the server 1302 computes a location to display as a map on the terminal 1306. The following operations represent the difference between the present embodiment and the previous embodiment.

At a step 1013, the server 1302 searches a map data base for a map to the destination and thins portions other than the vicinity of the map display location. At a step 1014, the server 1302 transmits to the terminal 1306 a map of the vicinity of the position of the vehicle 1305, the information on a route computed at the step 1011, the map display location found at the step 1012 and the map to the destination found at the step 1013.

At a step 1004, the terminal 1306 receives the computed information on the route, the identified map display location and the map to the destination from the server 1302, and stores them in the memory 101. In the case of a straight run along a road, only information on the road is shown in the map. In the case of a crossing at which the vehicle 1305 is supposed to make a turn, on the other hand, detailed information on the crossing is included on the map.

Assume that the vehicle 1305 departs from Hitachi-city to a location in Tokyo. In this case, since the driver can take either the Joban expressway or national road No. 6, only information on the Joban expressway and national road No. 6 is transmitted to the terminal 1306. Information on roads other than the Joban expressway and national road No. 6 is not transmitted. If the vehicle gets off from the Joban expressway or national road No. 6, the terminal 1306 again makes a request for a route and a map to the destination to the server 1302 and the server 1302 transmits them to the terminal 1306 accordingly.

It should be noted that, as described earlier, the destination is entered by the user only at a build-up time of the terminal 1306 and is stored in the terminal 1306 until the vehicle 1305 arrives at the destination.

While the vehicle 1305 is running, the GPS 102 keeps measuring the position of the vehicle 1305 at a step 1005 after data is received from the server 1302 and processing is carried out in accordance with the newly measured position. To be more specific, the present position of the vehicle 1305 is examined to determine whether the position is the map display location, an enlarged-map display location, a destination or another location. If the vehicle 1305 is determined to have slipped out from the selected route, the flow of the processing goes back to the step 1003.

If the present position of the vehicle 1305 is determined to be the vicinity of the map display location, the flow of the processing goes on to a step 1006 at which the terminal 1306 displays a map of the vicinity of the map display location based on the map data received from the server 1302. If the present position of the vehicle 1305 is determined to be the vicinity of the enlarged-map display location, the flow of the processing goes on to a step 1007 at which the terminal 1306 displays a map of the vicinity of the enlarged-map display location. It should be noted that the processing of the step 1007 can be carried out only if vector map data has been received from the server 1302. In another case, the size of the memory is small so that only information on a route to be taken is received from the server 1302 without detailed data of the vicinity of the map display location. In this case, the map data of the route traveled so far is erased so that the detailed data of the vicinity of the map display location can be newly requested from the server 1302. An example of such a vicinity is an area within a radius of 1 to 5 km from the map display location. If the present position of the vehicle 1305 is the destination, the flow of the processing goes on to a step 1009 at which the same processing as the step 212 of the flowchart shown in FIG. 2 is carried out. In other cases, the flow of the processing goes on to a step 1008 at which a map and a route are displayed.

A route in the vicinity of the map display location can be computed by the server 1302. If the user is a member, the information on a route is then received from the server 1302. If the user is not a member, on the other hand, image data representing the route on the map is received from the server 1302. As an alternative, a member can receive vector map data of the vicinity of the map display location from the server 1302. In this case, the terminal 1306 computes a route based on the vector map data received from the server 1302.

In addition, if the vehicle 1305 is running straight along a road, it is not necessary to display anything, or only information on landmarks in close proximity to the position of the vehicle 1305 may be displayed. As an alternative, the map information downloaded initially can be displayed.

FIG. 11 is an explanatory diagram showing a rough map display of main points on a route. As shown in the figure, a screen 1101 displays a national road 1102, a school 1103, a post office 1104 and a vehicle position 1105. No other information is displayed. In the case of running straight along a road, a display at this level is helpful to the driver.

Even in the case of running straight along a road, however, the user may feel uneasy about how much more time it takes to arrive at a crossing to make a turn. In such a case, a displayed landmark may serve as a standard as to where the vehicle 1305 is currently located. Information on a landmark can be downloaded from the server 1302 after a route has been determined or when the user wants to know where the vehicle 1305 is currently located.

In the processing represented by the flowchart shown in FIG. 10, when the vehicle 1305 arrives at the destination, the flow of the processing goes on from the step 1005 to the step 1009 at which the information on a route, the member ID and the map information stored in the terminal 1306 are deleted to complete the entire processing.

In the embodiment shown in FIG. 10, data thinned in the server 1302 is transmitted to the terminal 1306. Instead of thinning data, a priority level can be assigned by the server 1302 to vector data from the beginning. Data is then transmitted by the server 1302 to the terminal 1306 in accordance with the priority level and the size of the free area left in the memory employed in the terminal 1306 at that time. This configuration will be explained.

Assume that the size of the memory employed in the terminal 1306 is small. In this case, only information on main roads such as an expressway or a national road is transmitted by the server 1302 to the terminal 1306. If a free area is still left in the memory after the information on main roads such as an expressway or a national road is stored in the memory, detailed road data is also transmitted. That is to say, high priority levels are assigned to a highway such as an expressway or a national road while low priority levels are assigned to other roads as shown in FIG. 17.

In this configuration, if the size of the memory employed in the terminal 1306 is not sufficient, a route leading to a destination is displayed roughly as expressways and national roads while other small roads are not displayed.

Three typical parameters determining the priority levels are the type of the road, the distance from the position of the vehicle 1305 to the road and the distance from the route to the road. More specifically, with respect to the type of the road, roads are listed in a decreasing-priority order as follows: an expressway, a national road, a state road and other roads. With respect to the distance from the position of the vehicle 1305 to the road and the distance from the route to the road, the shorter the distance, the higher the priority level assigned to the road.

The server 1302 determines which map data is to be transmitted to the terminal 1306 by considering these parameters for information included in map data. In this regard, it is the thinning determination unit 412 that determines the priority levels described above.

The thinning determination unit 412 is initially provided with a priority-level definition table defining downloading priority levels on the basis of the parameters like the table of FIG. 17 defining priority levels for roads. Then, the thinning determination unit 412 receives a result of route calculation used for determining a road to be downloaded by referring to the priority-level definition table.

It should be noted that, if a plurality of parameters are applicable, the thinning determination unit 412 concretely determines which parameter is to take precedence of others or how parameters are combined in accordance with the condition prevailing at that time.

For example, when selecting a route from Hitachi-city to a location in Tokyo as a route to be downloaded, the server 1302 gives data of the Joban expressway the highest priority. If the amount of data does not exceed the size of the memory employed in the terminal 1306, the server 1302 also prepares data concerning national road No. 6 from Hitachi-city to the location in Tokyo. If there is still a margin in the memory, data of other roads is also made available. Then. the server 1302 transmits the information on the roads to the terminal 1306.

It should be noted that, for the same road, the closer the portion of the road to the position of the car 1605, the higher the priority level of the portion. In the case of the Joban expressway, for example, the portion of the expressway in Hitachi-city has the highest priority level. The farther the vehicle 1605 travels on the expressway from the city, the lower the priority level of the road will be.

If the entire route leading to the destination can not be downloaded at once, the portion of the route traveled by the vehicle 1605 is erased from the terminal 1306 to create a free area in the memory. A portion of the route that has not been stored in the memory can thus be downloaded.

Another example of assignment of priority levels to map data to be downloaded will be explained. In this example, only a detailed map of the vicinity of the position of the vehicle 1605 is downloaded. A map to the destination is not. In this case, a high priority level is not necessarily assigned to main roads as described above. Instead, priority levels can be assigned dynamically for each range of downloading as follows.

Assume that information on roads from Hitachi-city to a location in Tokyo is downloaded as an example. In this case, the server 1302 prepares data of roads to the closest interchange on the Joban expressway. If the amount of data is smaller than the size of the memory employed in the terminal 1306, data of the Joban expressway leading to Tokyo is also made available. If there is still a margin in the memory, data of national road No. 6 is also prepared.

When the preparation of the data is completed, the server 1302 transmits the data to the terminal 1306. For the Joban expressway and national road No. 6, the closer the portion of the road to the position of the vehicle 1305, the higher the priority level assigned to the portion as described earlier. As an alternative, data of a main road and a road constituting the route can be downloaded. That is to say, the priority level assigned to a main road such as an expressway or a national road is secondary to a road serving as a route.

Figure 14:
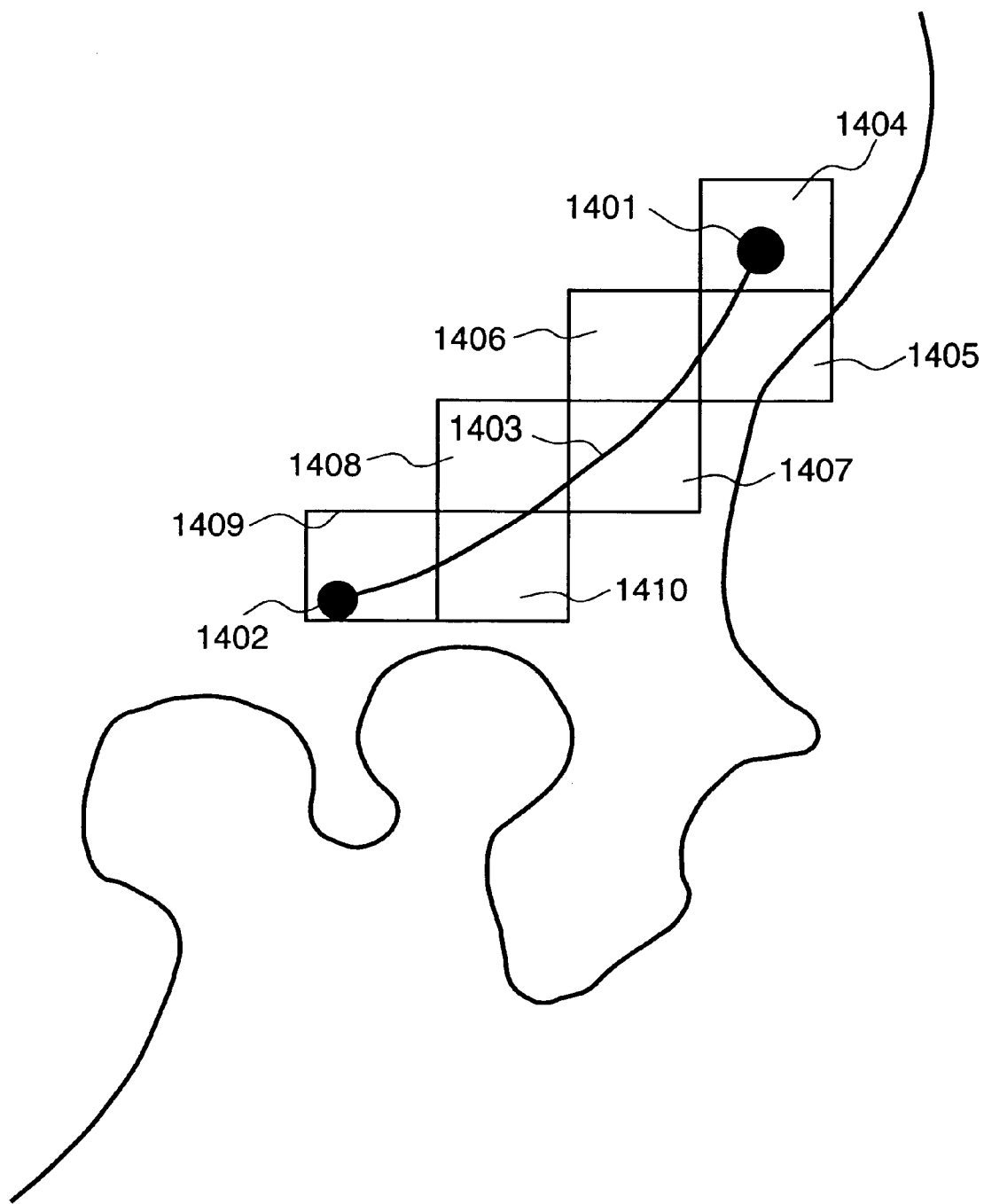
FIG. 14 is a diagram showing examples of a map mesh and route information.

FIG. 14 is an explanatory diagram showing examples of a map mesh and route information for the example of the travel from Hitachi-city to a location in Tokyo described above. Priority levels assigned to road information transmitted to the terminal 1306 will be explained with reference to this figure. It should be noted that, in this example, the user of the terminal 1306 is assumed to be a member having a right to receive a vector map from the server 1302.

In the figure, a route 1403 begins from a start point 1401 and terminates at an end point 1402. Even though details are not shown in the figure, the route is assumed to be a portion of the Joban expressway.

After calculation of a route has been finished, the server 1302 selects roads and information which is to be transmitted to the terminal 1306 from map meshes 1404 to 1410.

First of all, if only a route from the start point 1401 to the end point 1402 is to be transmitted, a route in the map mesh 1404 closest to the start point 1401 is extracted. The amount of the route data is examined and compared with the size of the memory indicated in information transmitted by the terminal 1306. If the former is smaller than the latter, a route in the map mesh 1405 is also extracted. Thereafter, routes leading to the map mesh 1410 are extracted one after another as long as the total amount of route data does not exceed the size of the memory employed in the terminal 1306. The extraction of routes is discontinued before the total amount of route data exceeds the size of the memory. Timing to discontinue the extraction of routes is determined typically to correspond to a threshold value which is set typically at 80% of the size of the memory received from the terminal 1306.

If there is still a margin in the size of the memory of the terminal 1306 even after routes up to the map mesh 1410 have been extracted, national roads from the map mesh 1404 to the map mesh 1410 are also extracted one after another. Timing to discontinue the extraction of national roads is determined typically to correspond to 80% of the size of the memory received from the terminal 1306, as is the case with the route extraction described above.

Figure 15A:
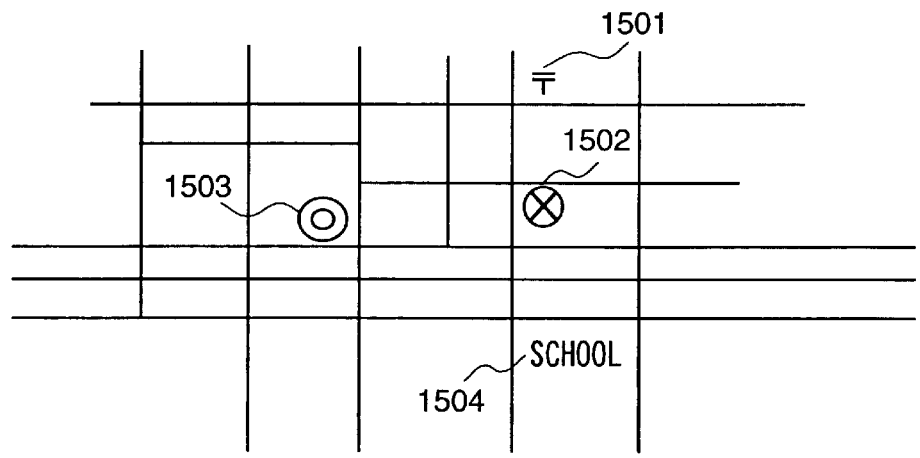
FIG. 15(a) is an explanatory diagram showing typical map data stored in the server.
Figure 15B:
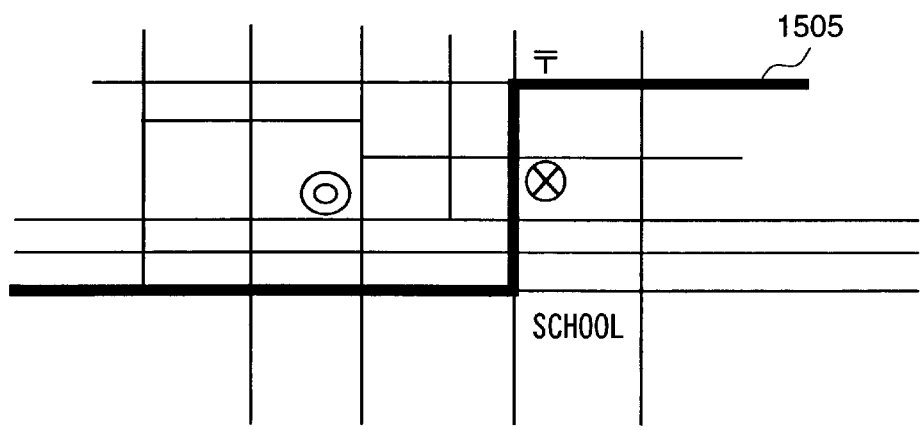
FIG. 15(b) is an explanatory diagram showing a typical display of a map and route information.
Figure 15C:
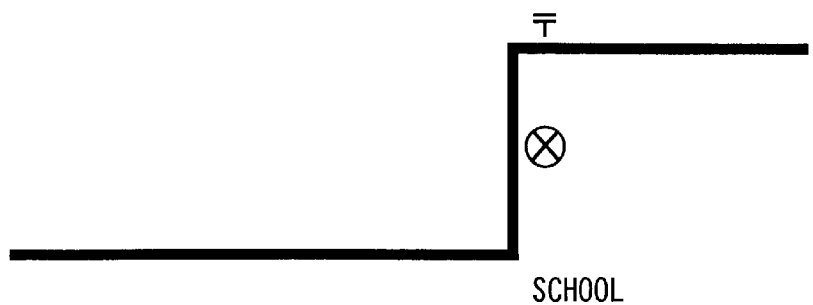
FIG. 15(c) is an explanatory diagram showing typical data transmitted by the server to the terminal.

FIGS. 15(*a*) to 15(*c*) are diagrams showing an example of extraction with route data taking precedence.

To be more specific, FIG. 15(*a*) is a diagram showing typical map data stored in the server 1302. As shown in the figure, the map data includes a post office 1501, a police office 1502, a prefectural office 1503 and a school 1504.

FIG. 15(*b*) is a diagram showing a typical display of a map and a route 1505 obtained as a result of route computation carried out by the server 1302. FIG. 15(*c*) is a diagram showing typical data transmitted to the terminal 1306 for the route 1505 shown in FIG. 15(*b*). As shown in FIG. 15(*c*), the data includes the post office 1501, the police office 1502, the school 1504 and the route 1505. Not located on the route 1505, the prefectural office 1503 is not included in the transmitted data.

Instead of giving the highest priority to route data as described above, there is also the following technique whereby extraction is started from the vicinity of the start point 1401.

First of all, after data of a route in the map mesh 1401 is extracted, data of roads in close proximity to the route is extracted. Extracted names of crossings will also be useful to the user. If the route is a road with no crossings, such as an expressway, only route data is extracted. In this case, since the vehicle 1305 needs to run straight along the route, there will hardly be a problem even if information other than the route data is not transmitted to the terminal 1306.

If there is a margin in the size of the memory employed in the terminal 1306, similar processing is carried out for the next map mesh 1402. Thereafter, if there is a margin in the size of the memory employed in the terminal 1306, similar processing is further carried out for the next map mesh 1403 and the subsequent map meshes. As 80% of the free area in the memory is reached, the processing is discontinued and data is transmitted to the terminal 1306.

The processing described above can be carried out to download data to the terminal 1306 prior to departure. However, the memory may not be capable of accommodating all the data. In this case, the remaining data can be downloaded during the travel along the route by erasing data of routes already traveled by the vehicle 1305 so far. In the middle of the route, the processing described above is carried out by using the present position of the vehicle 1305 as a start point 1401.

In addition, the server 1302 can also be configured to adjust the technique of providing map data by not only taking the size of the memory employed in the terminal 1306 into consideration, but also utilizing information on resources of other types available in the terminal 1306. Information on resources of types other than the memory is transmitted by the terminal 1306 to the server 1302 as information on the terminal 1306. Examples of information on the terminal 1306 are a communication rate and a display type. The information on the terminal 1306 is used in the server 1302 directly or indirectly to determine the timing to transmit map data.

The following description provides an example in which map data is transmitted by the server 1302 to the terminal 1306 by taking the transmission time into consideration. That is to say, data which can be transmitted within a period of time is prepared before being transmitted to the terminal 1306.

Assume that the communication rate is 9600 bps and the time to reception of data by the terminal 1306 is 30 seconds. In this case, the amount of data that can be transmitted within the 30-second period of time is 36 KB. Thus, data in the amount of 36 KB is prepared before being transmitted to the terminal 1306. During the preparation, the priority order described above is followed.

On the other hand, the terminal 1306 must make a request for a map to the server 1302 at least 30 seconds before the map is actually required. A location to make such a request can be found as a location preceding a place requiring the map by a distance which can be found from the communication rate and the speed of the vehicle 1306.

When the terminal 1306 is about to exit an expressway at an interchange, it is desirable to complete reception of the map before arriving at the interchange. In this case, the time it takes to arrive at the interchange can be calculated from the speed of the vehicle 1305 and, at the same time, the size of a free area available in the memory of the terminal 1306 is examined.

In addition, if the communication rate is known, timing to request a map can be determined from 3 parameters, namely, the speed of the vehicle 1306, the size of the memory and the communication rate. Assume that the speed of the vehicle 1306 is 100 km/h, the size of the memory is 80 KB and the communication rate is 9600 bps. Since the time it takes to receive data in the amount of 80 KB is about 66.7 seconds, the reception of data must be started before the vehicle 1305 arrives at a location preceding the interchange by at least 1.85 km. In actuality, however, the transmitted data will not occupy all the free area of the memory. Thus, since the amount of data can be assumed to be smaller than 80 KB, the location to start the reception of the data can be closer to the interchange than the calculated distance of 1.85 km.

Details of an operation carried out by the search engine 403 to search a data base for a destination will be explained with reference to FIGS. 18 to 23.

Figure 18:
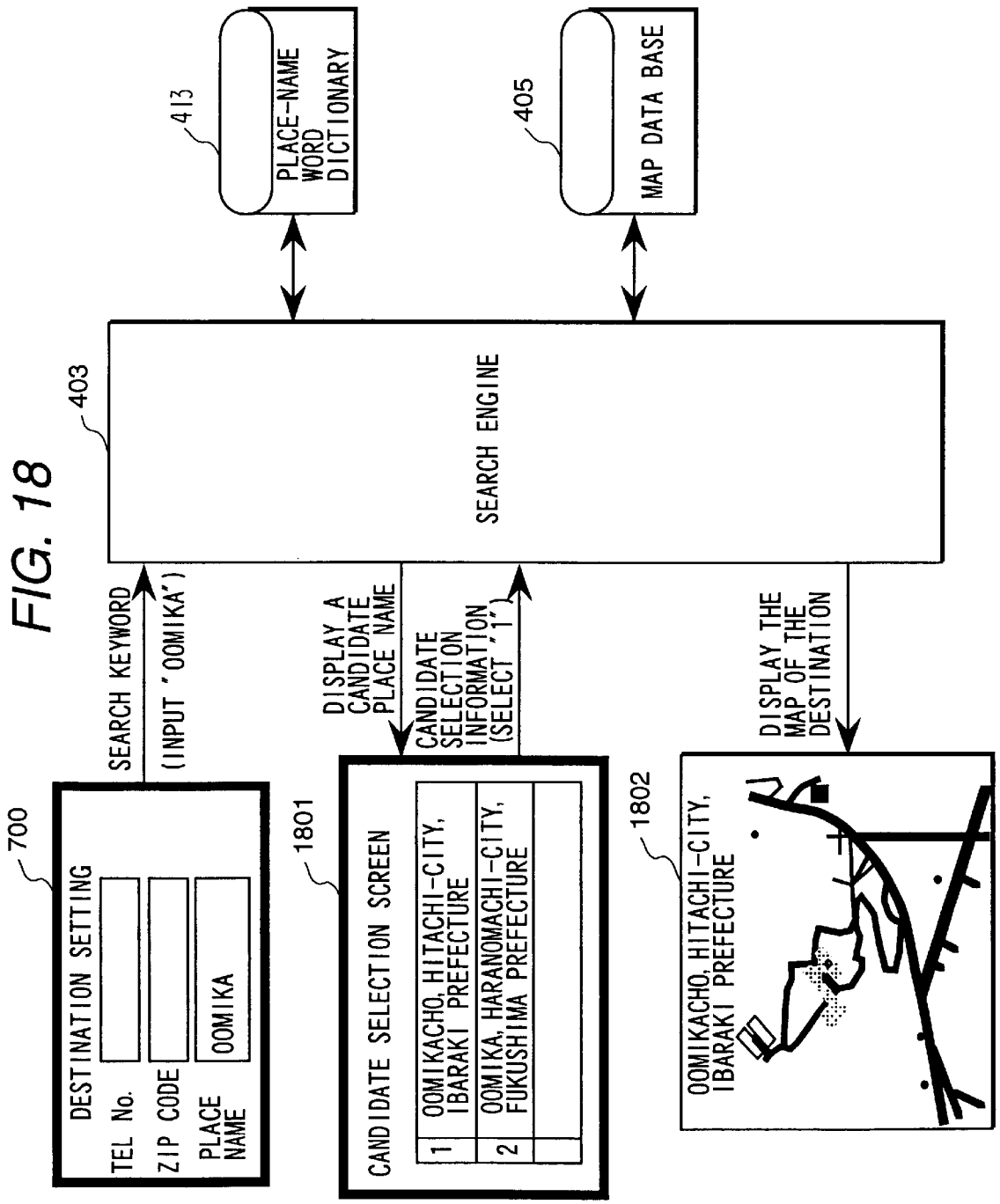
FIG. 18 is a diagram showing an outline of the operation of a search engine.

FIG. 18 is a functional diagram showing a configuration and an outline of the operation of the search engine 403. First of all, a destination named "Oomika" is entered to a place-name input field on a destination setting screen 700. This literal input is used as a search keyword supplied to the search engine 403. The search engine 403 searches the place-name word dictionary 413 for candidate place names matching the search keyword and displays the candidate place names on a screen 1801. If a plurality of candidate place names for the literal input "Oomika" exist as shown in the figure, the user enters a selected candidate place name to the search engine 403. In this example, the user enters "1" to confirm that the first candidate first name is the correct one. The search engine 403 then searches the map data base 405 for map data matching the latitude and the longitude of the selected place name, and displays the map as a map 1802 of the destination.

Figure 19:
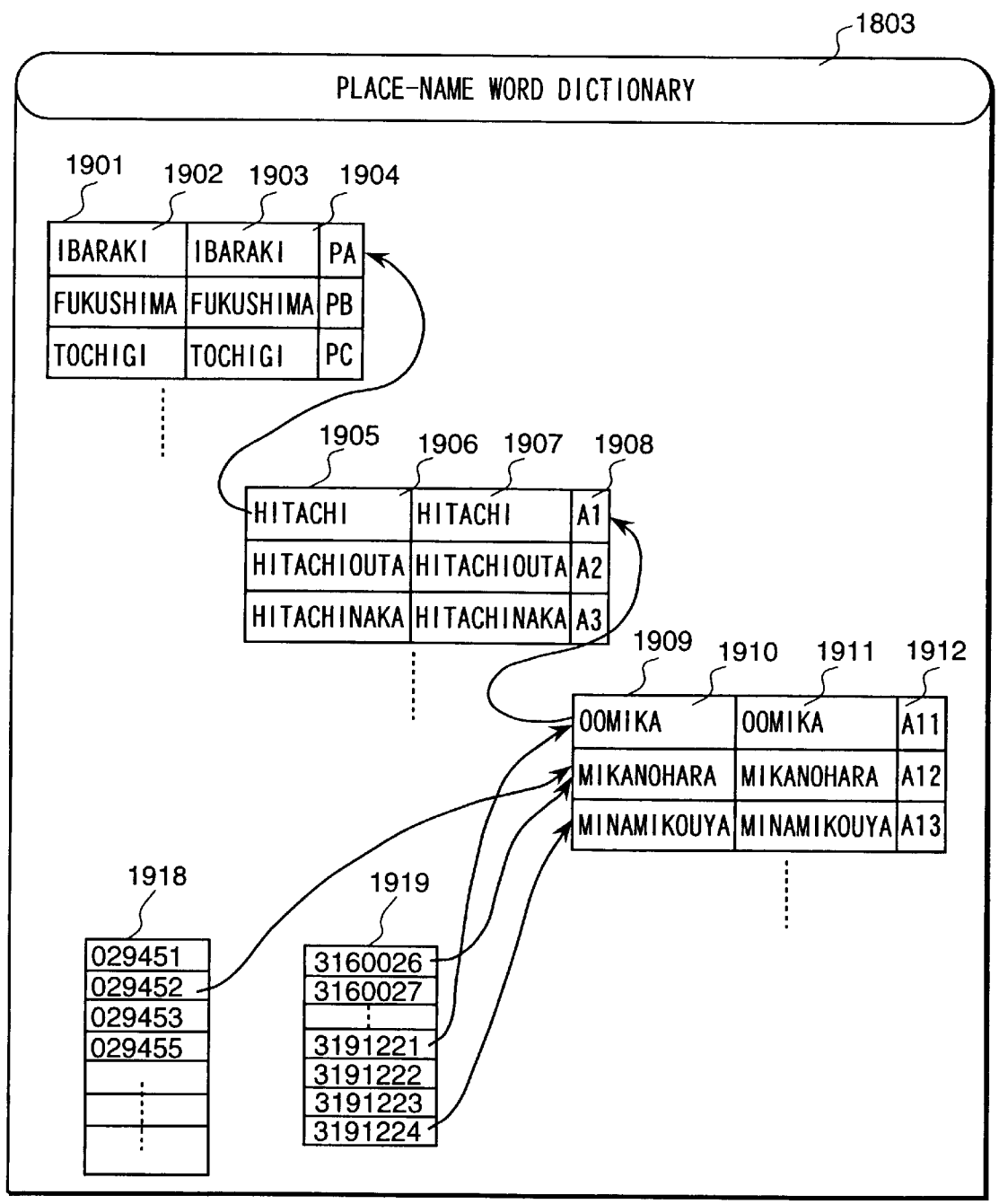
FIG. 19 is a diagram showing the structure of a word dictionary of place names.

FIG. 19 is an explanatory diagram showing the structure of the word dictionary 1803 of place names. As shown in the figure, place names are organized into an hierarchical structure typically comprising an urban/rural prefectural layer 1901, a city layer 1905 and a town/village layer 1909. Each of the hierarchical layers 1901, 1905 and 1909 comprises a phonetic transcription column (corresponding to literal inputs), a spelling column and a map information column. To be more specific, the urban/rural prefectural hierarchical layer 1901 comprises a phonetic transcription column 1902, a spelling column 1903 and a map information column 1904. By the same token, the city hierarchical layer 1905 comprises a phonetic transcription column 1906, a spelling column 1907 and a map information column 1908. Likewise, the town/village hierarchical layer 1909 comprises a phonetic transcription column 1910, a spelling column 1911 and a map information column 1912. Any town/village hierarchical layer 1909 is linked to a city row at the city hierarchical layer 1905. Similarly, any city hierarchical layer 1905 is linked to a prefectural row at the urban/rural prefectural hierarchical layer 1901. In addition, any table of long-distance telephone-number prefixes 1918 and any table of zip codes 1919 are linked to a town/village row at the town/village hierarchical layer 1909. Thus, a destination can be found by using a long-distance prefix of a telephone number or a zip code of the destination entered by the user in place of a place name as an index.

Figure 20:
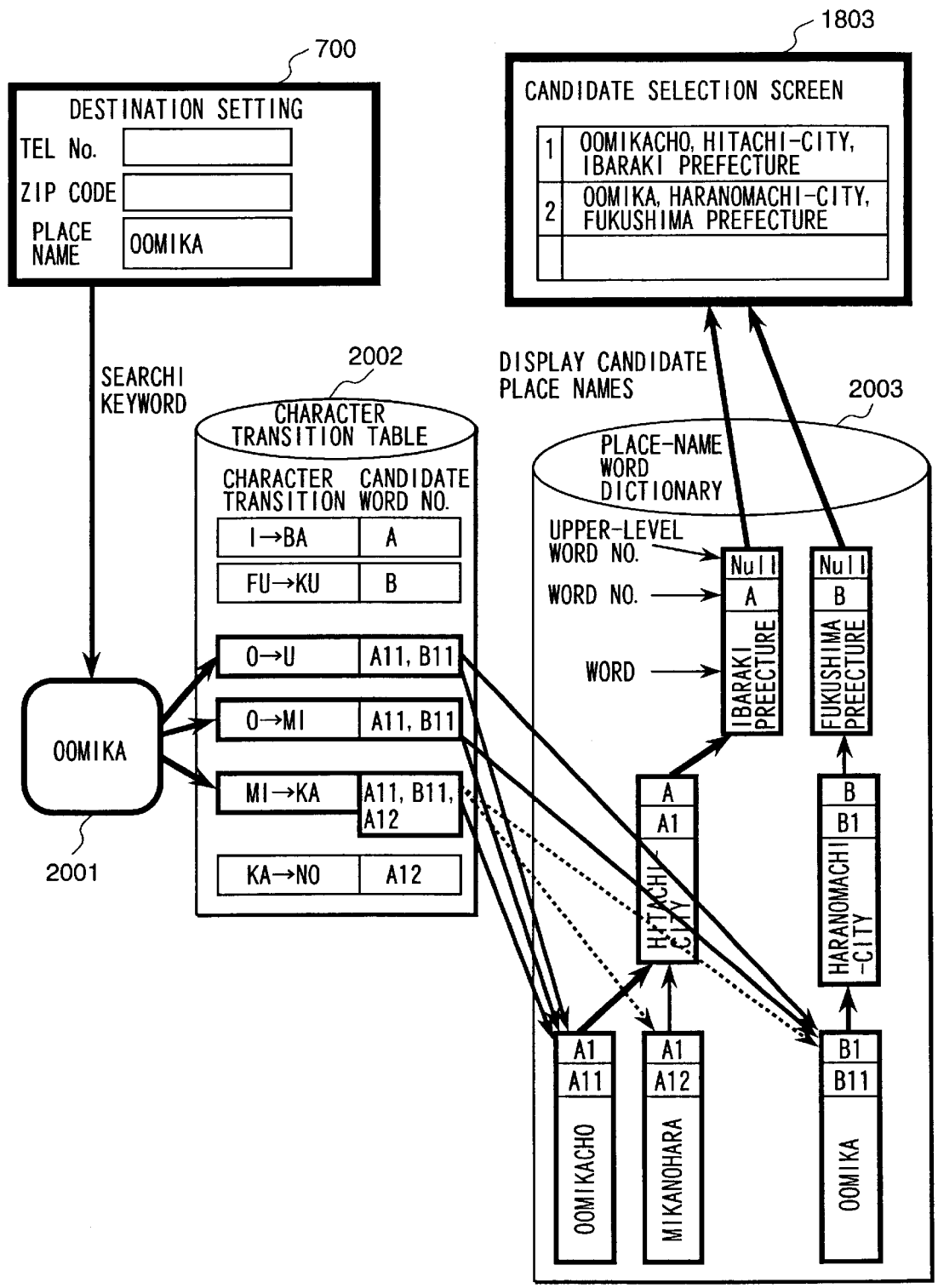
FIG. 20 is a diagram showing operations to search the word dictionary of place names for candidates for the place name of a destination.

FIG. 20 is a diagram showing operations carried out by the search engine 403 to search the word dictionary of place names for candidates for the place name of a destination. The operations are exemplified by a word dictionary 2003 of addresses and a character transition table 2002. As shown in FIG. 20, the address word dictionary 2003 is also organized into a hierarchical structure typically comprising an urban/rural prefectural layer, a city layer and a town/village layer. Each item at each of the hierarchical layers comprises an item number, an upper-layer-item number and the spelling of the item (string of characters). An access to an item is made by specifying the item number of the item. An item is linked to an upper-layer item at the immediately higher hierarchical layer by the upper-layer-item number of the item. A character transition table 2002 is a table of 2 character transitions. Associated with pointers each pointing to an item at the town/village hierarchical layer in the place-name word dictionary 2003, each of the character transitions represents a transition (an index) from a character to another in a string of characters in a literal input.

Take the Japanese word "Oomika" as an example of a literal input. In this word, there are 3 transitions, namely, a transition from the Japanese character "O" to the Japanese character "o", a transition from the Japanese character "o" to the Japanese character "mi" and a transition from the Japanese character "mi" to the Japanese character "ka". The 3 transitions are associated with pointers which point to items A11, A12, and B11 at the town/village hierarchical layer in the place-name word dictionary 2003. The items A11, A12 and B11 indicate candidate place names. To be more specific, in the example shown in FIG. 20, the item A11 linked to an item A1 at the city hierarchical layer which is linked to an item A at the urban/rural prefectural hierarchical layer indicates a candidate place name of "Oomikacho, Hitachi-city, Ibaraki Prefecture". The item A12 also linked to an item A1 at the city hierarchical layer which is linked to an item A at the urban/rural prefectural hierarchical layer indicates a candidate place name of "Mikanoharacho, Hitachi-city, Ibaraki Prefecture". The item B11 linked to an item B1 at the city hierarchical layer which is linked to an item B at the urban/rural prefectural hierarchical layer indicates a candidate place name of "Oomika, Haranomachi-city, Fukushima Prefecture". By sorting these 3 candidate place names into an order of decreasing search-keyword-matching-character-counts, a correct candidate can be selected with ease. It is needless to say that, in order to reduce the number of candidate name places, a candidate name place with a number of characters matching the search keyword smaller than a threshold value can be omitted from the list. In the example shown in FIG. 20, "Mikanoharacho, Hitachi-city, Ibaraki Prefecture" has fewest characters matching the search keyword, and can be eliminated from the list of candidate place names. As a result, only 2 candidate place names are left on a screen 1803.

Figure 21:
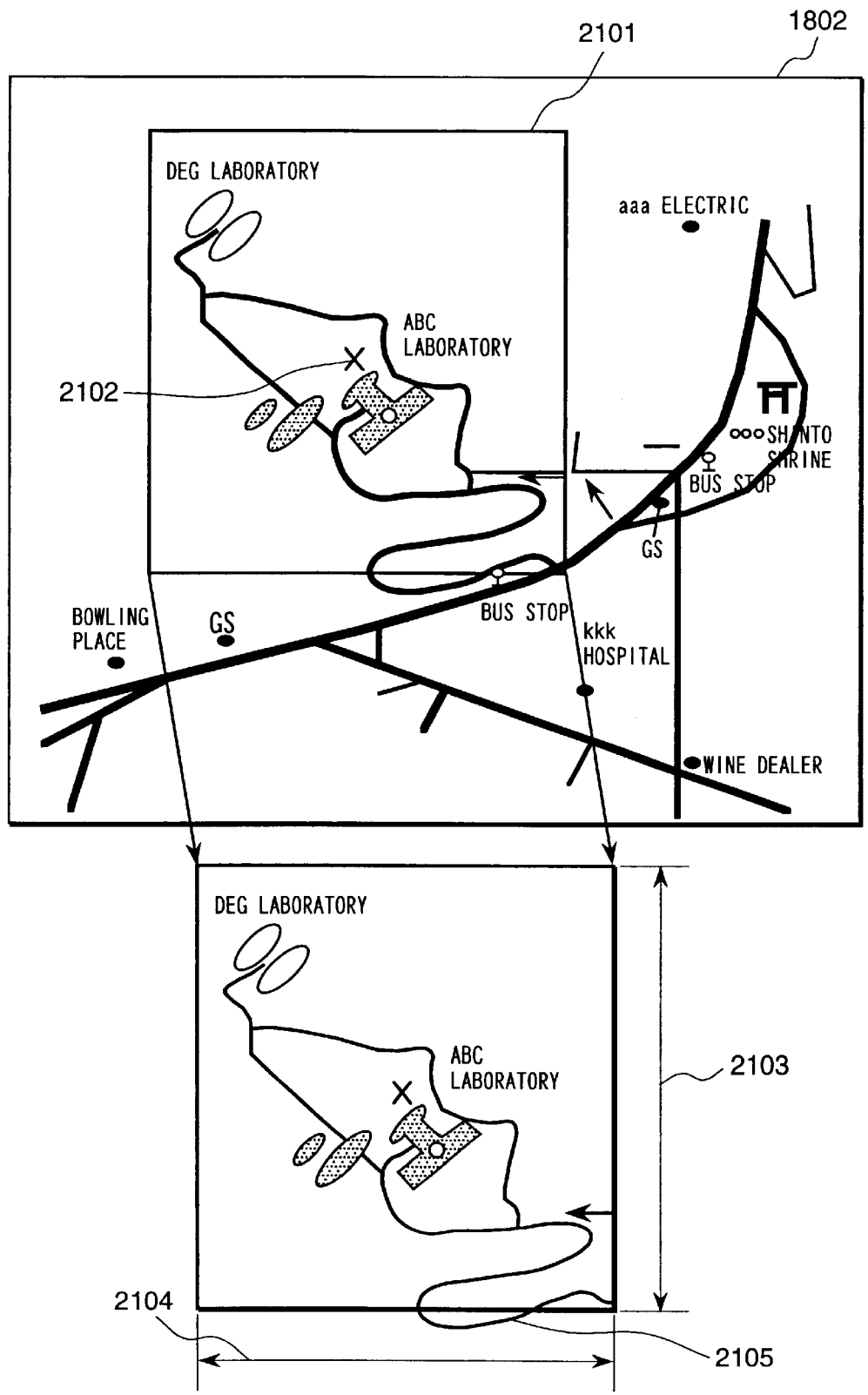
FIG. 21 is a diagram showing processing to cut a portion of a map off the map.

FIG. 21 is an explanatory diagram showing processing to cut a portion of a map out of the map or, to be more specific, processing to cut a predetermined area out of a complete map or a plurality of block maps. This processing is referred to hereafter as clip processing. In general, a map is controlled in units each comprising a plurality of blocks. If a portion of a block including a place of interest is cut out, however, an adjacent block needs to be cut out as well. Assume that a map of a predetermined area centered at the destination is desired. An example of such an area is an area centered at a location 2102. In the figure, the area has a vertical dimension 2103 and a horizontal dimension 2104. In order to obtain the predetermined area within the dimensions 2103 and 2104, the whole map 1802 can be clipped. In the case of a vector map, a line of linked vectors is also displayed as indicated by reference numeral 2105. However, since the number of maps is small, the communication cost can be reduced. Of course, this problem can be avoided by computing the coordinates of the protruding vector and changing the start and end points.

FIG. 22 is a flowchart representing detailed processing carried out by the server 1302 at the step 218 of the flowchart shown in FIG. 2 to search a data base for a destination. As shown in the figure, the flowchart begins with a step 2201 at which the literal input of a destination is received from the terminal 1306. At a step 2202, the character transition table 2002 is searched for pointers pointing to the place names of the destinations matching the literal input. At a step 2203, the place-name word dictionary 2003 is searched for candidate place names pointed to by the pointers and the candidate place names are sorted.

At a step 2204, the sorted candidate place names are transmitted to the terminal 1306. At a step 2205, a place name selected by the user is received from the terminal 1306 and confirmed as the name of the destination. At a step 2206, a map area in a predetermined range indicated by the latitude and longitude of the destination is clipped. Finally, at a step 2207, the clipped map is transmitted to the terminal 1306.

FIG. 23 is a diagram of other typical operations carried out by the user to enter the name of a place. The literal input in this example 700 shown in this figure is "Oomikahitachi" with an order of characters opposite to the correct spelling "Hitachioomika" stored in the name-place word dictionary. Even in this case, the operation to search the data base for the correct name place can be carried out. This is because the present invention uses information on a transition from one character to another. After candidate name places are sorted on the basis of the number of characters matching the literal input, only one candidate is found. By the same token, the correct place name can be found by carrying out a similar search operation even when "Oomikamura" including an excessive string of characters "mura" is entered as a lateral input. Likewise, the correct place name can be found by carrying out a similar search operation even if "Oomiga" with a wrong character "ga" is entered as a lateral input.

In the present invention, a 2-character transition table (index) is searched to find a pointer pointing to a correct place name as described above. It should be noted that a 1-character transition table or a 3-character transition table can also be used to give the same effect.

In the embodiments described above, the terminal 1306 is connected to the server 1302 when necessary. If the communication charge is assumed to be computed in accordance with the communication time, the system adopted in the embodiments incurs a lower communication cost. If the communication charge is assumed to be computed in accordance with the amount of data communicated, however, it is not necessarily good to cut off the communication. In this case, services different from those described above can be rendered.

That is to say, in the embodiments described above, the terminal 1306 downloads information on routes and a judgment on the location to download the information is also formed by the terminal 1306. However, it is also possible to provide a configuration wherein information on routes is left in the server 1302 and a judgment on the location to download the information is also left to the server 1302. In this configuration, the terminal 1306 transmits vehicle-position information, the vehicle speed and terminal information to the server 1302 at fixed time intervals to be used by the server 1302 to form a judgment as to whether or not to download a map. In an alternative configuration, the terminal 1306 transmits vehicle-position information, the vehicle speed and terminal information to the server 1302 at fixed distances instead of fixed time intervals. In still an alternative configuration, the server 1302 properly determines a location to download map data under a condition determined in advance.

According to a configuration in which timing to download map data is adjusted by the server 1302 as described above, the server 1302 gives the terminal 1306 a warning when the vehicle 1305 slips off from the route and is capable of avoiding downloading at a location such as a tunnel where it is impossible or difficult to carry out stable communication. As a result, it is possible to render the services of providing information with a high degree of efficiency and a high degree of reliability.

It should be noted that, while one terminal 1306 is provided for one server 1302 in the embodiments in order to make the explanation simple, the scope of the present invention is not limited to the embodiments. The information providing system can have a configuration wherein one server 1302 controls a plurality of terminals 1306 or vehicles 1305 individually, providing them with requested information. In the configuration shown in FIG. 13, for example, the server 1302 connected to the Internet 1302 is capable of serving a plurality of terminals 1306.

In addition, the embodiments described above each have a configuration in which a terminal 1306 makes a telephone call to the server 1302 to download map data. As an alternative, the server 1302 can also make a telephone call to a terminal 1306 to transmit a map. During calculation of a route, for example, not only is a map display location or a location to download map data found, but a time at which the vehicle 1305 is expected to pass through the location can also be estimated. In this case, the server 1302 makes a telephone call to the terminal 1306, and transmits a map of the vicinity of the map display location to be passed through at the estimated time when the estimated time is nearing.

The present invention provides a terminal 1306 which is mounted on a vehicle 1305 and used for providing a route guide showing directions leading to a destination. It should be noted that the present invention can also be applied to portable and home terminals with the same configuration. That is to say, the same configuration can be adopted as long as a map can be downloaded through a communication line.

According to the information providing system provided by the present invention, there is provided a means which allows the user to download a map whenever needed from a server on a network by merely entering a portion of the literal name of a destination.

In addition, according to the information providing system provided by the present invention, a terminal for receiving map data is capable of receiving a service to provide minimum map data necessary for navigation even if the size of the memory resource in the terminal is small.

What is claimed is:

1. An information providing system comprising:
    a terminal mounted on a vehicle and used for providing a route guide showing directions to a destination;
    a server for providing information to said terminal including at least a map used in said route guide showing directions to said destination; and
    an information providing timing determination means in either said server or said terminal for determining timing to transmit information including at least said map from said server to said terminal.

2. An information providing system according to claim 1 wherein:
    said terminal comprises:
        destination setting means for setting a destination;
        position detection means for detecting the present position of said vehicle;
        display control means for generating picture data for said route guide by using information received from said server and transferring said picture data to a display means; and
        terminal-side communication means for carrying out communications with said server,
    said information providing timing determination means including means for determining whether or not said vehicle has arrived at a location determined in advance by using the position of said vehicle detected by said position detection means; and wherein
    information including at least said map is downloaded from said server to said terminal when said vehicle is determined to have arrived at said location determined in advance.

3. An information providing system according to claim 1 wherein said terminal has means for allowing a user to determine whether or not information including at least said map is to be downloaded with said timing to transmit said information including at least said map from said server to said terminal as determined by said information providing timing determination means.

4. An information providing system according to claim 1 wherein said server comprises:
    means for forming a judgment as to whether or not a user of said terminal is a member cataloged in said information providing system; and
    means for providing at least one of vector map data and image map data to said terminal if a result of said judgment indicates that said user is a member or said image map data to said terminal if said result of said judgment indicates that said user is not a member.

5. An information providing system comprising:
    a terminal mounted on a vehicle and used for providing a route guide showing directions to a destination;
    a server for providing to said terminal, information including at least a map used in said route guide showing directions to said destination; and
    means provided in either said terminal or said server and used for acquiring information on resources presently available in said terminal as well as calculating the amount of information including at least said map in accordance with said information on resources,
    wherein said server generates information to be transmitted to said terminal in accordance with said calculated amount of information.

6. An information providing system according to claim 5 wherein said information on resources available in said terminal includes at least one of a memory size, a communication rate and a display type.

7. An information providing system according to claim 2 wherein said location determined in advance is one of the following:
    a location at which a map serving as a route guide is to be displayed in said terminal;
    a position corresponding to said location;
    a crossing at which a user of said terminal is supposed to make a turn;
    a position corresponding to said crossing; and
    a position set by using a guide route found on the basis of said destination and the present position of said vehicle.

8. An information providing system according to claim 2 wherein said display control means employed in said terminal executes control to display nothing or to show no detailed display on said display means when said vehicle is on a route guide at a position different from said location determined in advance.

9. An information providing system according to claim 1 wherein:
    either said terminal or said server is provided with:
        means for forming a judgment as to whether or not said vehicle having said terminal mounted thereon has slipped off from a route provided by said route guide; and
        means for re-computing guide leading to said destination in case a result of said judgment indicates that said vehicle has slipped off said route guide, and
    said information providing timing determination means determines a location to transmit information including at least said map to said terminal by using said re-computed guide route.

10. An information providing system according to claim 1 wherein said terminal has a user setting means for setting an identifier of user of said terminal and including said identifier in a communication packet transmitted to said server.

11. An information providing system according to claim 10 wherein said terminal further has storage means for storing said user identifier and said destination until said vehicle arrives at said destination.

12. An information providing system according to claim 2 wherein said terminal uses a portable telephone as said terminal-side communication means.

13. An information providing system according to claim 12 wherein said terminal-side communication means executes control to connect said terminal-side communication means to said server when communication becomes necessary and to disconnect said terminal-side communication means from said server when said communication is completed.

14. An information providing system according to claim 10 wherein said terminal uses a portable telephone as a means of communication with said server and the telephone number of said portable telephone is used as said user identifier.

15. An information providing system according to claim 1 wherein:
    said terminal further has means for changing information received from said server in order to allow said received information to be displayed three-dimensionally; and
    said display control means of said terminal uses said changed information to generate picture data for a three-dimensional display.

16. An information providing system according to claim 1 wherein said terminal has means for computing a route based on map data received from said server.

17. An information providing system according to claim 5 wherein:
    said server has means for generating information on a guide route leading to said destination; and
    said means for generating information on a guide route assigns priority levels to map elements to be included in map data constituting said information on a guide route and generates said information on a guide route to be transmitted from time to time in accordance with said assigned levels.

18. An information providing system according to claim 17 wherein the highest one among said priority levels is assigned to a road used as a route provided by said route guide.

19. An information providing system according to claim 18 wherein the second highest one among said priority levels is assigned to a main road and a road existing in the vicinity of a road used as said route provided by said guide.

20. An information providing system according to claim 19 wherein said main road is either an expressway or a national road.

21. An information providing system according to claim 1 wherein said information providing timing determination means determines timing to transmit information including at least said map to said terminal by using at least one of information on resources currently available in said terminal and information on a guide route leading to said destination.

22. An information providing system according to claim 1 wherein:
    said server comprises:
        route computing means for computing a route to be traveled by said vehicle;
        map transmission location determination means for determining a location on said computed route to transmit a map to said terminal; and
        passing-through-time prediction means for predicting a time at which said vehicle will pass through said location on said computed route to transmit a map to said terminal, and wherein
    said information providing timing determination means is provided in said server and determines said time predicted by said passing-through-time prediction means as timing to transmit a map.

23. A terminal of an information providing system comprising:
    a terminal mounted on a vehicle and used for providing a route guide showing directions to a destination; and
    a server for providing information to said terminal including at least a map used in said route guide showing directions to said destination, wherein: said terminal comprises:
    destination setting means for setting a destination;
    position detection means for detecting the present position of said vehicle;
    display control means for generating picture data for said route guide by using information received from said server and transferring said picture data to a display means;
    terminal-side communication means carrying out communications with said server; and
    information providing timing determination means for determining timing to transmit information including at least said map from said server to said terminal.

24. A server of an information providing system comprising:
    a terminal mounted on a vehicle and used for providing a route guide showing directions to a destination; and
    a server for providing information to said terminal, including at least a map used in said route guide showing directions to said destination, wherein: said server comprises:
    server-side communication means for communicating with said terminal;
    map-data storage means for storing map;
    processing means for generating information including at least said map data by utilizing information on said destination and the position of said vehicle received from said terminal and for transmitting said generated information to said terminal by way of said server-side communication means; and
    information providing timing determination means for determining timing to transmit information including at least said map from said server to said terminal.

25. An information providing system comprising:
    a terminal mounted on a vehicle and used for providing a route guide showing directions to a destination; and
    a server for providing said terminal with information including at least a place name and a map used in said route guide showing directions to said destination,
    wherein said server comprises:
        candidate place name providing means for executing the steps of:
            receiving a string of characters entered by user to said terminal and transmitted by said terminal to said server wherein said string of characters represents a portion of the place name of a destination to be used in said route guide showing directions to said destination;
            searching a data base of place names by using index information formed from said string of characters for candidates for the place name of said destination matching said string of characters;
            transmitting said candidates to said terminal; and requesting said terminal to select one of said candidates; and a map providing means for transmitting to said terminal a map for a selected candidate for the place name of said destination transmitted by said terminal to said server.

26. An information providing system according to claim 25 wherein map data provided by said map providing means is vector map data.

27. An information providing system according to claim 26 wherein, when said server receives the place name of a candidate selected by said terminal as requested by said server, said map providing means clips a predetermined range centering at said candidate from said map and transmits said range to said terminal.

28. A server of an information providing system comprising:

a terminal mounted on a vehicle and used for providing a route guide showing directions to a destination; and a server for providing said terminal with information including at least a place name and a map used in said route guide showing directions to said destination, said server comprising:

a server-side communication means for communicating with said terminal;

map-data storage means for storing map data; and place-name storage means for storing literal phonetic transcriptions and correct spellings of place names; and processing means for generating information including at least said map by utilizing information on said destination and the position of said vehicle received from said terminal and for transmitting said generated information to said terminal by way of said server-side communication means.

29. An information providing system according to claim 25 wherein:

said data base comprises literal phonetic transcriptions of place names and correct spellings of said place names; and said candidate place name providing means searches said data base for a candidate one of said place names matching index information formed from any string of characters included in an input literal phonetic transcription and transmits said candidate place name to said terminal.

30. An information providing system according to claim 25 wherein:

said candidate place name providing means has a character transition table comprising transitions among at least two characters pertaining to any string of characters included in any one of said literal phonetic transcriptions and indexes associated with said transitions; and said index information is formed from any string of characters included in an input literal phonetic transcription by said candidate place name providing means by executing the steps of:

searching said character transition table for particular ones of said indexes matching any of said transitions in said string of characters included in said input lateral phonetic transcription; and composing said index information from said particular indexes.

* * * * *